US012053771B2

(12) United States Patent
Blaszcak et al.

(10) Patent No.: US 12,053,771 B2
(45) **Date of Patent: *Aug. 6, 2024**

(54) ERGONOMIC PIPETTE TIPS

(71) Applicant: BIOTIX, INC., San Diego, CA (US)

(72) Inventors: Peter Paul Blaszcak, San Diego, CA (US); Arta Motadel, San Diego, CA (US)

(73) Assignee: BIOTIX, INC., San Diego, CA (US)

( * ) Notice: Subject to any disclaimer, the term of this patent is extended or adjusted under 35 U.S.C. 154(b) by 754 days.

This patent is subject to a terminal disclaimer.

(21) Appl. No.: 17/175,094

(22) Filed: Feb. 12, 2021

(65) Prior Publication Data

US 2021/0268492 A1 Sep. 2, 2021

Related U.S. Application Data

(63) Continuation of application No. 16/934,878, filed on Jul. 21, 2020, now Pat. No. 10,946,374, which is a continuation of application No. 16/609,913, filed as application No. PCT/US2018/032590 on May 14, 2018, now abandoned.

(60) Provisional application No. 62/507,381, filed on May 17, 2017.

(51) Int. Cl.
*B01L 3/02* (2006.01)

(52) U.S. Cl.
CPC ..... *B01L 3/0275* (2013.01); *B01L 2200/0689* (2013.01); *B01L 2200/087* (2013.01); *B01L 2300/0832* (2013.01); *B01L 2300/0858* (2013.01)

(58) Field of Classification Search
None
See application file for complete search history.

(56) References Cited

U.S. PATENT DOCUMENTS

| | | | |
|---|---|---|---|
| 4,072,330 | A | 2/1978 | Brysch |
| D255,601 | S | 6/1980 | De Vaughn |
| D256,052 | S | 7/1980 | De Vaughn |
| 4,212,204 | A | 7/1980 | St. Amand |
| 4,232,669 | A | 11/1980 | Nitshke |
| 4,349,109 | A | 9/1982 | Scordato et al. |
| 4,461,328 | A | 7/1984 | Kenney |
| 4,537,231 | A | 8/1985 | Hasskamp |

(Continued)

FOREIGN PATENT DOCUMENTS

| | | | |
|---|---|---|---|
| CN | 101484242 | A | 7/2009 |
| CN | 202638449 | U | 1/2013 |

(Continued)

OTHER PUBLICATIONS

384. Ready. Set. Pipette!—384 well pipetting made easy, Eppendorf, General Lab Products, NEW: 16 and 24 channel pipettes and epT.I.P.S.® 384, 2018, 6 pages.

(Continued)

*Primary Examiner* — Matthew D Krcha
*Assistant Examiner* — Brittany I Fisher
(74) *Attorney, Agent, or Firm* — Standley Law Group LLP; Jeffrey S. Standley; Adam J. Smith

(57) ABSTRACT

Provided herein are pipette tips having a proximal region with grooves and panels configured to facilitate wall expansion or wall compression when a pipette tip is mounted onto and sealingly engages with an appropriately designed liquid dispensing device.

20 Claims, 12 Drawing Sheets

(56) References Cited

U.S. PATENT DOCUMENTS

| | | | | |
|---|---|---|---|---|
| 4,565,100 | A | 1/1986 | Malinoff | |
| 4,647,419 | A | 3/1987 | Helfer et al. | |
| 4,707,337 | A | 11/1987 | Jeffs et al. | |
| 4,721,680 | A | 1/1988 | Jeffs et al. | |
| 4,748,859 | A | 6/1988 | Magnussen, Jr. et al. | |
| 4,763,695 | A | 8/1988 | Dooley | |
| D300,561 | S | 4/1989 | Asa et al. | |
| 4,961,350 | A | 10/1990 | Tennstedt | |
| 5,000,921 | A | 3/1991 | Hanaway et al. | |
| 5,032,343 | A | 7/1991 | Jeffs et al. | |
| 5,156,811 | A | 10/1992 | White | |
| 5,223,225 | A | 6/1993 | Gautsch | |
| 5,232,669 | A | 8/1993 | Pardinas | |
| 5,343,909 | A | 9/1994 | Goodman | |
| 5,348,606 | A | 9/1994 | Hanaway et al. | |
| 5,487,997 | A | 1/1996 | Stolp | |
| 5,614,153 | A | 3/1997 | Hornberg | |
| 5,660,797 | A | 8/1997 | Jaervimaeki | |
| D384,418 | S | 9/1997 | Torti et al. | |
| 5,700,959 | A | 12/1997 | Homberg | |
| 5,827,745 | A | 10/1998 | Astle | |
| 5,849,248 | A | 12/1998 | Homberg | |
| 6,019,225 | A | 2/2000 | Kalmakis et al. | |
| 6,066,297 | A | 5/2000 | Torti et al. | |
| 6,103,198 | A | 8/2000 | Brophy et al. | |
| 6,116,099 | A | 9/2000 | Carl | |
| 6,197,259 | B1 | 3/2001 | Kelly et al. | |
| D439,986 | S | 4/2001 | Petrek | |
| 6,247,891 | B1 | 6/2001 | Lind | |
| 6,258,324 | B1 | 7/2001 | Yiu | |
| D461,904 | S | 8/2002 | Petrek | |
| D465,844 | S | 11/2002 | Anderson et al. | |
| D465,853 | S | 11/2002 | Petersen | |
| 6,482,362 | B1 | 11/2002 | Smith | |
| 6,566,145 | B2 | 5/2003 | Brewer | |
| 6,596,240 | B2 | 7/2003 | Taggart et al. | |
| D487,593 | S | 3/2004 | Sarna | |
| 7,335,337 | B1 * | 2/2008 | Smith | B01L 3/0275 422/513 |
| 7,585,467 | B2 | 9/2009 | Löhn | |
| 7,794,664 | B2 | 9/2010 | Pelletier et al. | |
| 8,105,555 | B2 | 1/2012 | Lahti | |
| 8,202,495 | B1 | 6/2012 | Smith | |
| D663,042 | S | 7/2012 | Motadel et al. | |
| 8,307,721 | B2 | 11/2012 | Motadel | |
| 8,323,585 | B2 | 12/2012 | Heavner | |
| D679,828 | S | 4/2013 | Motadel et al. | |
| D680,226 | S | 4/2013 | Motadel et al. | |
| D687,562 | S | 8/2013 | Motadel et al. | |
| D691,282 | S | 10/2013 | Motadel et al. | |
| 8,795,606 | B2 | 8/2014 | Motadel et al. | |
| 8,899,118 | B1 | 12/2014 | Seguin | |
| 9,101,923 | B2 | 8/2015 | Motadel et al. | |
| 9,156,030 | B2 | 10/2015 | Beese | |
| 9,302,262 | B2 | 4/2016 | Motadel et al. | |
| 9,486,803 | B2 | 11/2016 | Motadel et al. | |
| 9,597,680 | B2 | 3/2017 | Motadel et al. | |
| 9,636,672 | B2 | 4/2017 | Motadel et al. | |
| 9,884,319 | B2 | 2/2018 | Motadel et al. | |
| 10,307,753 | B2 | 6/2019 | Motadel et al. | |
| 10,654,037 | B2 | 5/2020 | Motadel et al. | |
| 10,828,633 | B2 | 11/2020 | Motadel | |
| 10,946,374 | B2 | 3/2021 | Blaszcak et al. | |
| 11,433,389 | B2 | 9/2022 | Motadel et al. | |
| 2003/0152494 | A1 | 8/2003 | Moritz et al. | |
| 2003/0156994 | A1 | 8/2003 | Mahler et al. | |
| 2005/0255005 | A1 | 11/2005 | Motadel | |
| 2006/0171851 | A1 | 8/2006 | Motadel | |
| 2006/0177352 | A1 | 8/2006 | Ziegmann et al. | |
| 2007/0017870 | A1 | 1/2007 | Belov et al. | |
| 2007/0231215 | A1 | 10/2007 | Mototsu et al. | |
| 2008/0078258 | A1 | 4/2008 | Price et al. | |
| 2009/0007702 | A1 | 1/2009 | Yiu | |
| 2009/0202392 | A1 | 8/2009 | Urano et al. | |
| 2009/0255949 | A1 | 10/2009 | Motadel | |
| 2009/0317303 | A1 | 12/2009 | Belz et al. | |
| 2010/0080734 | A1 | 4/2010 | Brophy et al. | |
| 2010/0143199 | A1 | 6/2010 | Lahti | |
| 2010/0196210 | A1 | 8/2010 | Jungheim et al. | |
| 2010/0218622 | A1 | 9/2010 | Motadel | |
| 2010/0221151 | A1 | 9/2010 | Motadel et al. | |
| 2010/0258578 | A1 | 10/2010 | Motadel | |
| 2011/0076205 | A1 | 3/2011 | Kelly et al. | |
| 2011/0136180 | A1 | 6/2011 | Bengtsson et al. | |
| 2011/0183433 | A1 | 7/2011 | Motadel et al. | |
| 2011/0259443 | A1 | 10/2011 | Preschutti et al. | |
| 2011/0300620 | A1 | 12/2011 | Belz et al. | |
| 2013/0164194 | A1 | 6/2013 | Motadel et al. | |
| 2013/0213151 | A1 * | 8/2013 | Beese | B01L 3/021 73/864.01 |
| 2013/0323140 | A1 | 12/2013 | Motadel et al. | |
| 2014/0314637 | A1 | 10/2014 | Motadel et al. | |
| 2015/0266017 | A1 | 9/2015 | Motadel et al. | |
| 2016/0167041 | A1 | 6/2016 | Curry et al. | |
| 2016/0263569 | A1 | 9/2016 | Motadel et al. | |
| 2017/0157604 | A1 | 6/2017 | Motadel et al. | |
| 2017/0165660 | A1 | 6/2017 | Motadel et al. | |
| 2018/0304250 | A1 | 10/2018 | Motadel et al. | |
| 2020/0001287 | A1 | 1/2020 | Motadel et al. | |
| 2020/0122136 | A1 | 4/2020 | Blaszcak et al. | |
| 2020/0316583 | A1 | 10/2020 | Motadel et al. | |
| 2020/0346204 | A1 | 11/2020 | Blaszcak et al. | |
| 2021/0039086 | A1 | 2/2021 | Motadel et al. | |

FOREIGN PATENT DOCUMENTS

| | | | |
|---|---|---|---|
| CN | 103170386 | A | 6/2013 |
| CN | 203556378 | U | 4/2014 |
| CN | 204247245 | U | 4/2015 |
| CN | 105854969 | A | 8/2016 |
| CN | 106132547 | A | 11/2016 |
| DE | 813301 | C | 9/1951 |
| EP | 0266155 | A2 | 5/1988 |
| EP | 0743095 | A1 | 11/1996 |
| EP | 1110613 | A1 | 6/2001 |
| EP | 1236030 | A1 | 9/2002 |
| EP | 1 839 752 | A2 | 10/2007 |
| EP | 1884286 | A1 | 2/2008 |
| EP | 2140941 | A1 | 1/2010 |
| EP | 2606977 | A1 | 6/2013 |
| JP | H08-266913 | A | 10/1996 |
| JP | 2007-253118 | A | 10/2007 |
| RU | 2144158 | C1 | 1/2000 |
| WO | 93/08913 | A1 | 5/1993 |
| WO | 01/36933 | A1 | 5/2001 |
| WO | 2006/093925 | A2 | 9/2006 |
| WO | 2010/008737 | A2 | 1/2010 |
| WO | 2010/054337 | A2 | 5/2010 |
| WO | 2010/081107 | A2 | 7/2010 |
| WO | 2011/091308 | A2 | 7/2011 |
| WO | 2013/170538 | A1 | 11/2013 |
| WO | 2013/181163 | A1 | 12/2013 |
| WO | 2016/094553 | A1 | 6/2016 |
| WO | 2018/213196 | A1 | 11/2018 |

OTHER PUBLICATIONS

Apricot Designs Pipette Tips Catalog for EZ-Load Tips, ESP Tips and High Volume Apricot Tips, http:/www.apricotdesigns.com/pipette_tips.http, Oct. 19, 2011, 5 pages.
Corning Deck Works Pipet Tips, Product Brochure, 2010, 8 pages.
International Preliminary Report on Patentability dated Nov. 28, 2019 in PCT Patent Application No. PCT/US2018/032590, filed on May 14, 2018, 9 pages.
International Preliminary Report on Patentability mailed on Aug. 2, 2012 in International Patent Application No. PCT/US2011/022129, filed on Jan. 21, 2011, 8 pages.
International Preliminary Report on Patentability mailed on Dec. 11, 2014 in International Patent Application No. PCT/US2013/042915, filed on May 28, 2013, 8 pages.

(56) References Cited

OTHER PUBLICATIONS

International Search Report and Written Opinion dated Jun. 27, 2018 in PCT Patent Application No. PCT/US2018/032590, filed on May 14, 2018, 8 pages.
International Search Report and Written Opinion mailed on Oct. 28, 2011 in International Patent Application No. PCT/US2011/022129, filed on Jan. 21, 2011, 10 pages.
International Search Report and Written Opinion mailed on Sep. 4, 2013 in International Patent Application No. PCT/US2013/042915, filed on May 28, 2013, 11 pages.
Office Action dated Apr. 5, 2013 in U.S. Appl. No. 13/484,220, filed May 30, 2012 and published as US 2013-0323140 on Dec. 5, 2013, 12 pages.
Office Action dated Apr. 15, 2014 in U.S. Appl. No. 13/011,747, filed Jan. 21, 2011 and published as US 2011-0183433 on Jul. 28, 2011, 12 pages.
Office Action dated Apr. 30, 2020 in U.S. Appl. No. 16/394,408, filed Apr. 25, 2019 and published as US 2020-0001287 on Jan. 2, 2020, 7 pages.
Office Action dated Aug. 4, 2014 in U.S. Appl. No. 13/773,553, filed Feb. 21, 2013 and published as US 2013-0164194 on Jun. 27, 2013, 6 pages.
Office Action dated Aug. 4, 2016 in U.S. Appl. No. 15/056,978, filed Feb. 29, 2016 and published as US 2016-0263569 on Sep. 15, 2016, 12 pages.
Office Action dated Aug. 8, 2019 in U.S. Appl. No. 15/852,614, filed Dec. 22, 2017 and published as US 2018-0304250 on Oct. 25, 2018, 10 pages.
Office Action dated Aug. 22, 2016 in U.S. Appl. No. 14/731,245, filed Jun. 4, 2015 and published as US 2015-0266017 on Sep. 24, 2015, 8 pages.
Office Action dated Dec. 1, 2015 in U.S. Appl. No. 14/320,177, filed on Jun. 30, 2014 and published as US 2014-0314637 on Oct. 23, 2014, 7 pages.
Office Action dated Dec. 3, 2012 in U.S. Appl. No. 29/413,135, filed on Feb. 10, 2012, 9 pages.
Office Action dated Dec. 3, 2012 in U.S. Appl. No. 29/413,368, filed Feb. 14, 2012, 11 pages.
Office Action dated Dec. 19, 2013 in U.S. Appl. No. 13/484,220, filed May 30, 2012 and published as US 2013-0323140 on Dec. 5, 2013, 13 pages.
Office Action dated Dec. 21, 2016 in U.S. Appl. No. 14/731,245, filed Jun. 4, 2015 and published as US 2015-0266017 on Sep. 24, 2015, 7 pages.
Office Action dated Dec. 22, 2014 in U.S. Appl. No. 13/773,553, filed Feb. 21, 2013 and published as US 2013-0164194 on Jun. 27, 2013, 7 pages.
Office Action dated Feb. 3, 2020 in U.S. Appl. No. 15/852,614, filed Dec. 22, 2017 and published as US-2018-0304250-A1 on Oct. 25, 2018, 11 pages.
Office Action dated Feb. 6, 2012 in U.S. Appl. No. 29/354,398, filed Jan. 22, 2010, 07 pages.
Office Action dated Feb. 11, 2016 in U.S. Appl. No. 13/011,747, filed Jan. 21, 2011 and published as US 2011-0183433 on Jul. 28, 2011, 8 pages.
Office Action dated Jan. 12, 2011 in U.S. Appl. No. 29/354,398, filed Jan. 22, 2010, 7 pages.
Office Action dated Jan. 14, 2014 in U.S. Appl. No. 13/773,553, filed Feb. 21, 2013 and published as US 2013-0164194 on Jun. 27, 2013, 9 pages.
Office Action dated Jan. 15, 2015 in U.S. Appl. No. 14/320,177, filed Jun. 30, 2014 and published as US 2014-0314637 on Oct. 23, 2014, 15 pages.
Office Action dated Jan. 24, 2019 in U.S. Appl. No. 15/444,883, filed Feb. 28, 2017 and published as US 2017-0165660 on Jun. 15, 2017, 7 pages.
Office Action dated Jan. 6, 2021 in U.S. Appl. No. 16/934,878, filed Jul. 21, 2020 and published as US-2020-0346204-A1 on Nov. 5, 2020, 9 pages.
Office Action dated Jul. 16, 2015 in U.S. Appl. No. 14/320,177, filed Jun. 30, 2014 and published as US 2014-0314637 on Oct. 23, 2014, 16 pages.
Office Action dated Jun. 8, 2015 in U.S. Appl. No. 13/011,747, filed Jan. 21, 2011 and published as US 2011-0183433 on Jul. 28, 2011, 7 pages.
Office Action dated Jun. 21, 2011 in U.S. Appl. No. 29/354,398, filed Jan. 22, 2010, 6 pages.
Office Action dated Jun. 26, 2020 in U.S. Appl. No. 16/394,408, filed Apr. 25, 2019 and published as US 2020-0001287 on Jan. 2, 2020, 5 pages.
Office Action dated Mar. 8, 2019 in U.S. Appl. No. 15/852,614, filed Dec. 22, 2017 and published as US 2018-0304250 on Oct. 25, 2018, 15 pages.
Office Action dated Mar. 10, 2015 in U.S. Appl. No. 13/773,553, filed Feb. 21, 2013 and published as US 2013-0164194 on Jun. 27, 2013, 8 pages.
Office Action dated Mar. 27, 2014 in U.S. Appl. No. 13/484,220, filed May 30, 2012 and published as US 2013-0323140 on Dec. 5, 2013, 7 pages.
Office Action dated May 3, 2013 in U.S. Appl. No. 13/773,553, filed Feb. 21, 2013 and published as US 2013-0164194 on Jun. 27, 2013, 11 pages.
Office Action dated May 5, 2017 in U.S. Appl. No. 15/427,005, filed Feb. 7, 2017 and published as US 2017-0157604 on Jun. 8, 2017, 14 pages.
Office Action dated May 23, 2012 in U.S. Appl. No. 29/354,398, filed Jan. 22, 2010, 8 pages.
Office Action dated Nov. 6, 2014 in U.S. Appl. No. 13/011,747, filed Jan. 21, 2011 and published as US 2011-0183433 on Jul. 28, 2011, 12 pages.
Office Action dated Nov. 18, 2016 in U.S. Appl. No. 15/056,978, filed Feb. 29, 2016 and published as US 2016-0263569 on Sep. 15, 2016, 8 pages.
Office Action dated Oct. 4, 2017 in U.S. Appl. No. 15/427,005, filed Feb. 7, 2017 and published as US 2017-0157604 on Jun. 8, 2017, 8 pages.
Office Action dated Oct. 14, 2015 in U.S. Appl. No. 13/011,747, filed Jan. 21, 2011 and published as US 2011-0183433 on Jul. 28, 2011, 7 pages.
Office Action dated Sep. 4, 2020 in U.S. Appl. No. 16/934,878, filed Jul. 21, 2020, 25 pages.
Office Action dated Sep. 5, 2018 in U.S. Appl. No. 15/444,883, filed Feb. 28, 2017 and published as US 2017-0165660 on Jun. 15, 2017, 8 pages.
Office Action dated Sep. 11, 2014 in U.S. Appl. No. 14/320,177, filed Jun. 30, 2014 and published as US 2014-0314637 on Oct. 23, 2014, 13 pages.
Office Action dated Sep. 13, 2013 in U.S. Appl. No. 13/011,747, filed Jan. 21, 2011 and published as US 2011-0183433 on Jul. 28, 2011, 13 pages.
Office Action dated Sep. 14, 2010 in U.S. Appl. No. 29/354,398, filed Jan. 22, 2010, 11 pages.
Office Action dated Sep. 16, 2016 in U.S. Appl. No. 13/011,747, filed Jan. 21, 2011 and published as US 2011-0183433 on Jul. 28, 2011, 8 pages.
Office Action mailed on Jan. 31, 2011 in Design U.S. Appl. No. 29/354,398, filed Jan. 22, 2010, 4 pages.
Fluid X, "Product Page for EZ Load Pipetting Heads", http://www.fluidx.co.uk/html/ezload head.html, Oct. 19, 2011, 2 pages.
Sigma-Aldrich Co., "Sorenson low binding aerosol barrier tips, MicroReach Guard, capacity 10ul", Catalog No. Z719390, Sep. 9, 2010, 1 page.
Sorenson Bioscience, Inc, "Liquid Handling Products", VWR 2008 Catalog, 2008, 24 pages.
Office Action dated Mar. 24, 2022 in U.S. Appl. No. 16/855,326, filed Apr. 22, 2020 and published as US-2020-0316583-A1 on Oct. 8, 2020, 17 pages.
Office Action dated Jun. 3, 2022 in U.S. Appl. No. 16/855,326, filed Apr. 22, 2020 and published as US-2020-0316583-A1 on Oct. 8, 2020, 9 pages.

* cited by examiner

Fig. 1
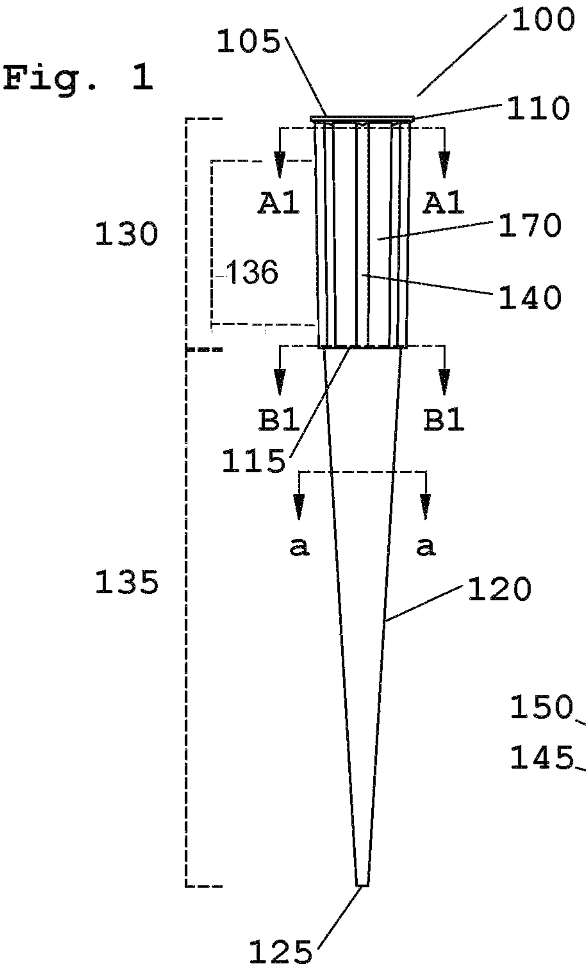
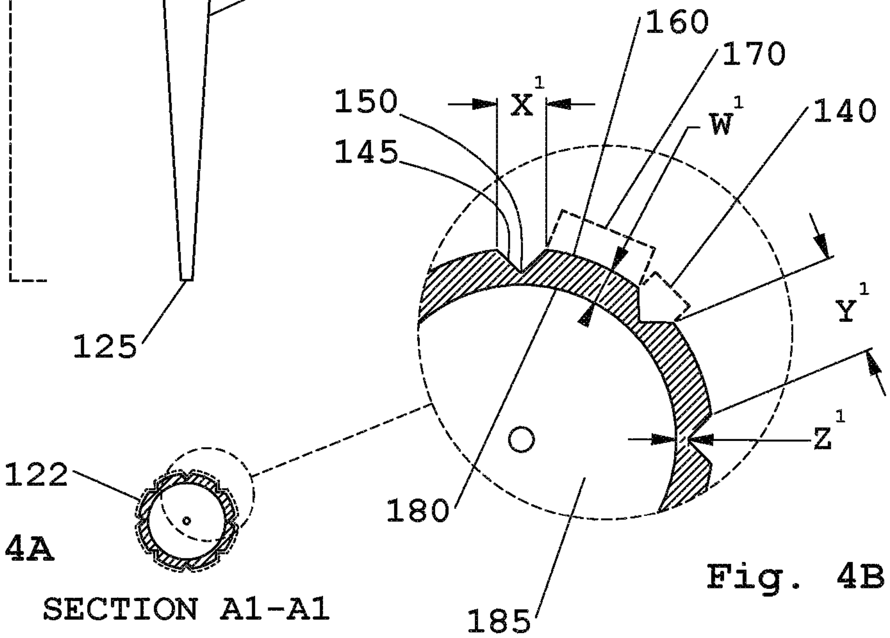
Fig. 4A
SECTION A1-A1
Fig. 4B
Fig. 5
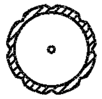
SECTION B1-B1
Fig. 6
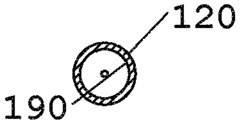
SECTION a-a Fig. 7
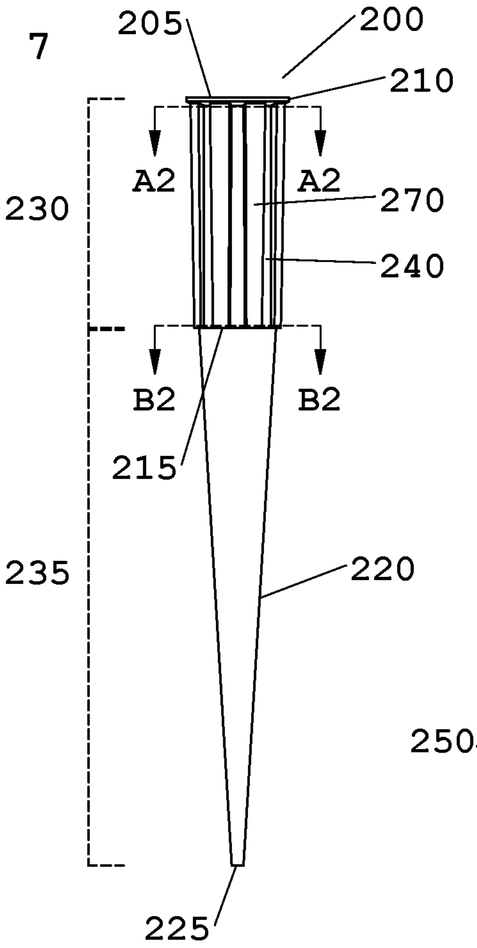
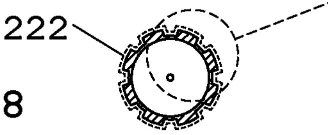
Fig. 8
SECTION A2-A2
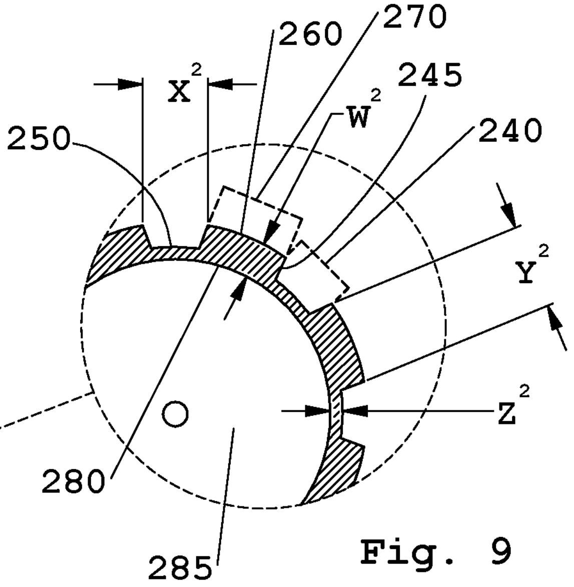
Fig. 9
Fig. 10
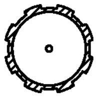
SECTION B2-B2

Fig. 11
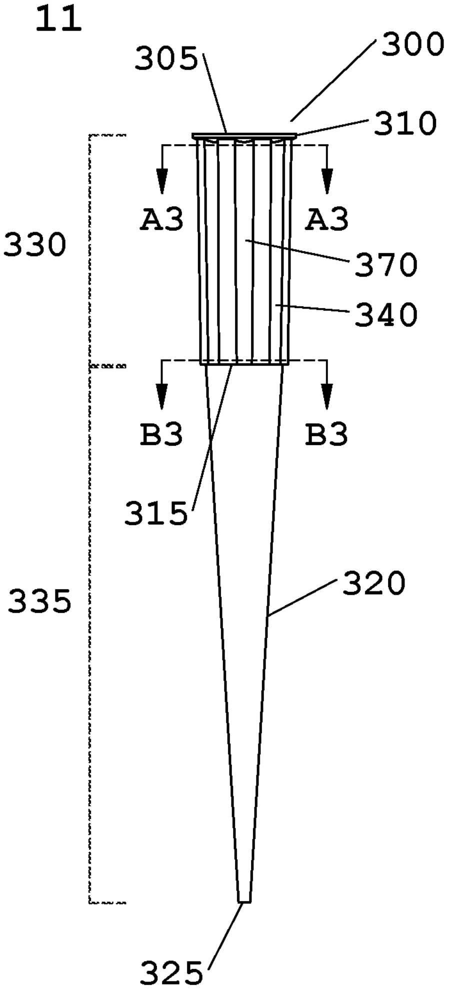
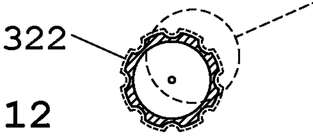
Fig. 12
SECTION A3-A3
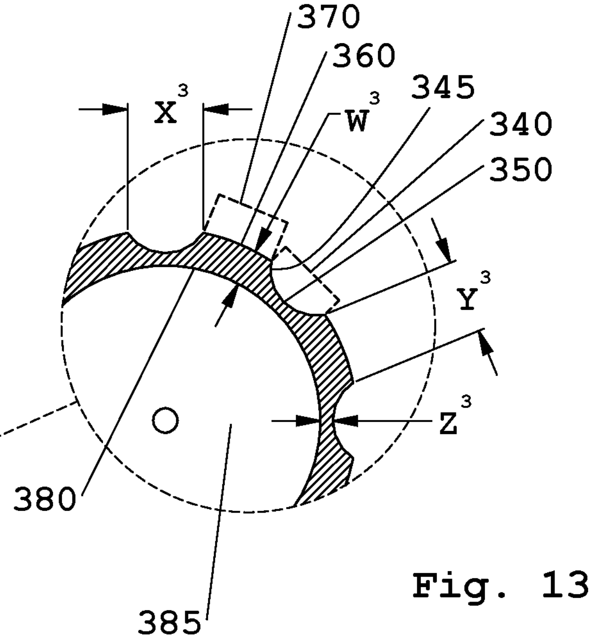
Fig. 13
Fig. 14
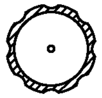
SECTION B3-B3

Fig. 15
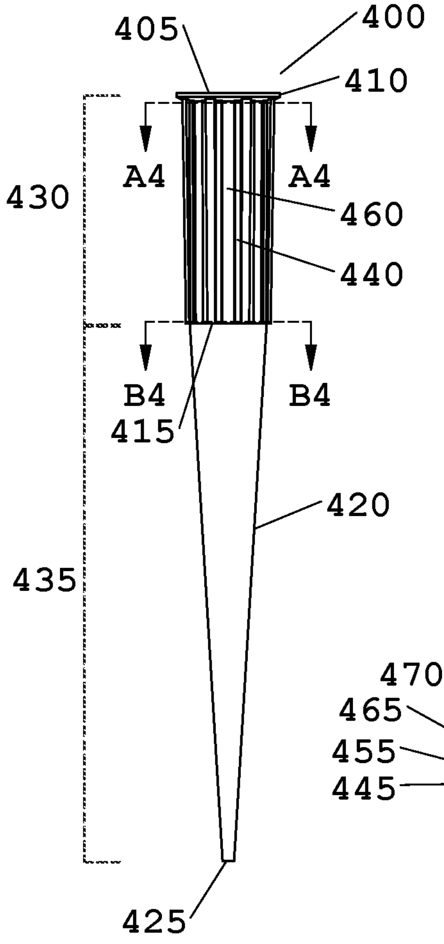
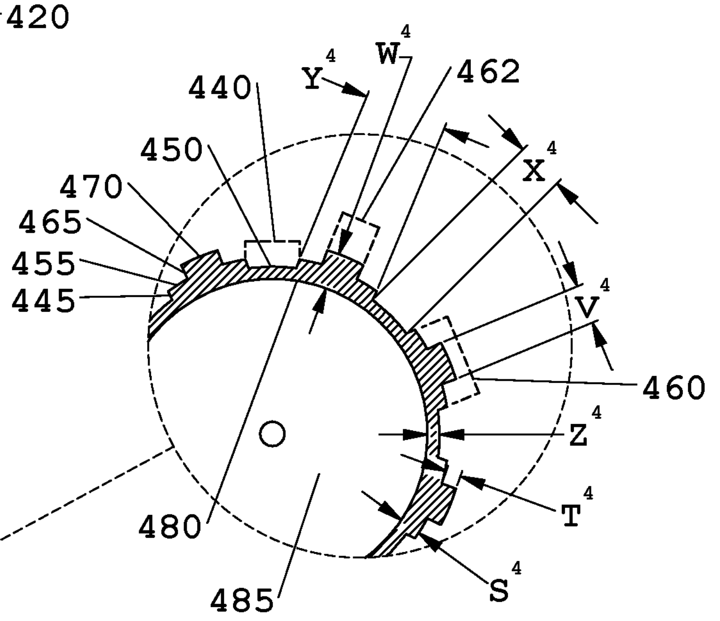
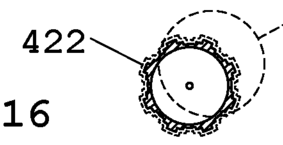
Fig. 16
SECTION A4-A4
Fig. 17
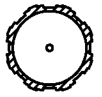
Fig. 18
SECTION B4-B4

Fig. 19
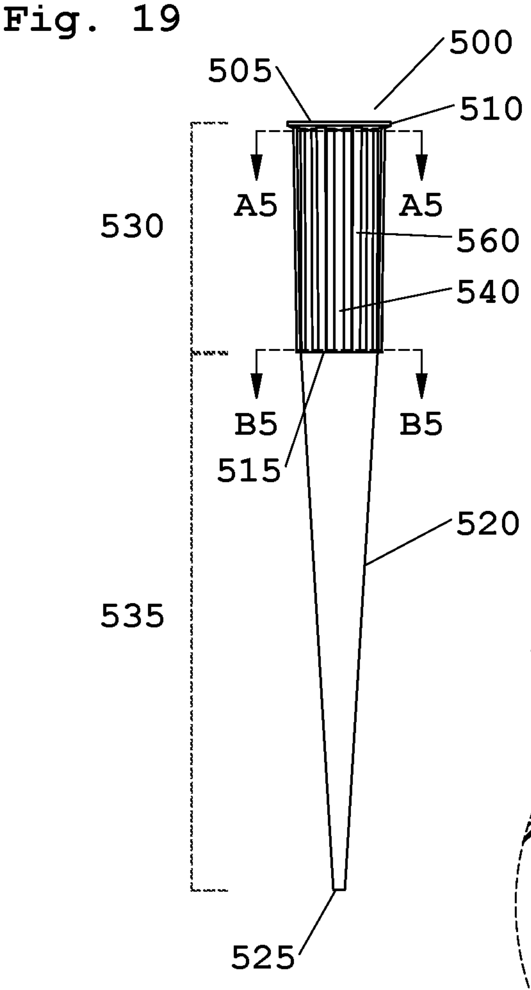
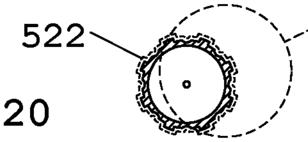
Fig. 20
SECTION A5-A5
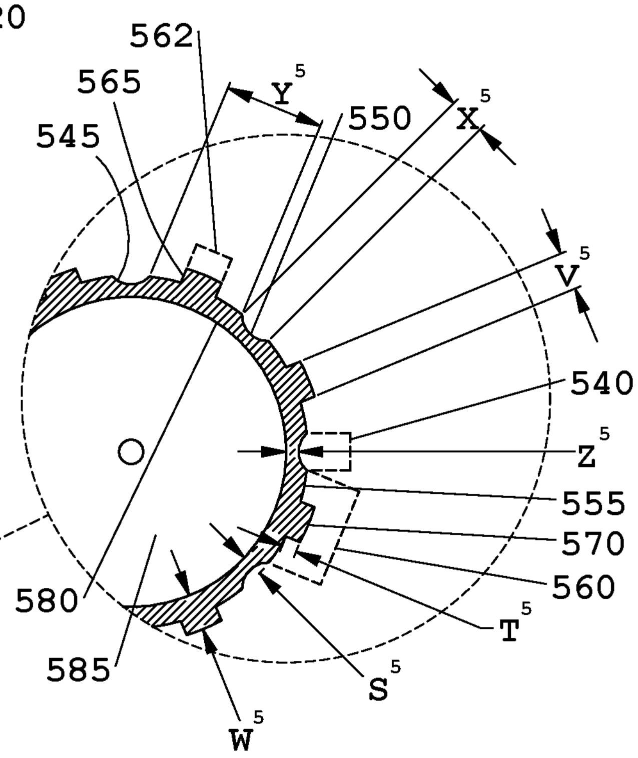
Fig. 21
Fig. 22
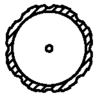
SECTION B5-B5

Fig. 23
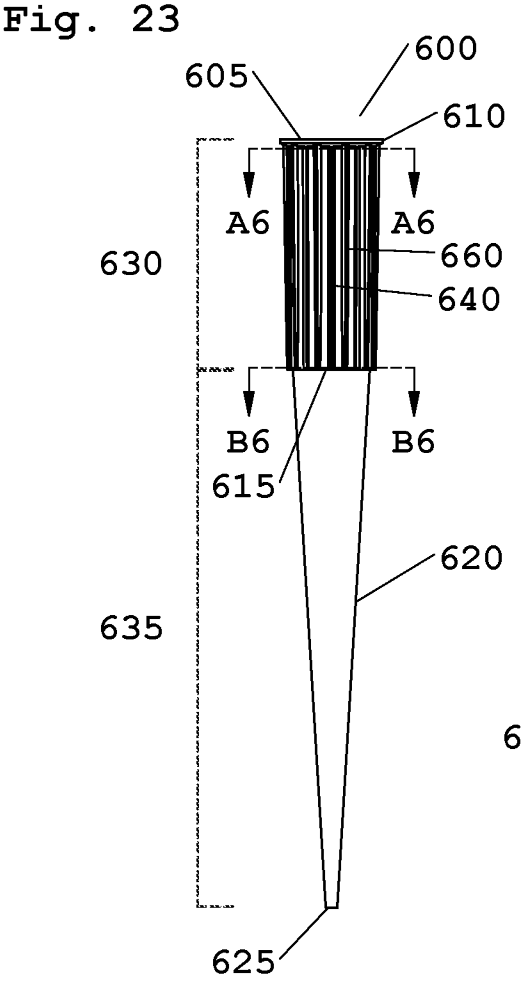
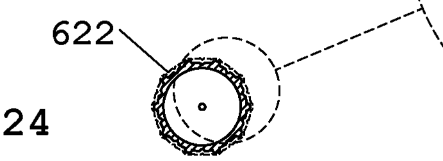
Fig. 24
SECTION A6-A6
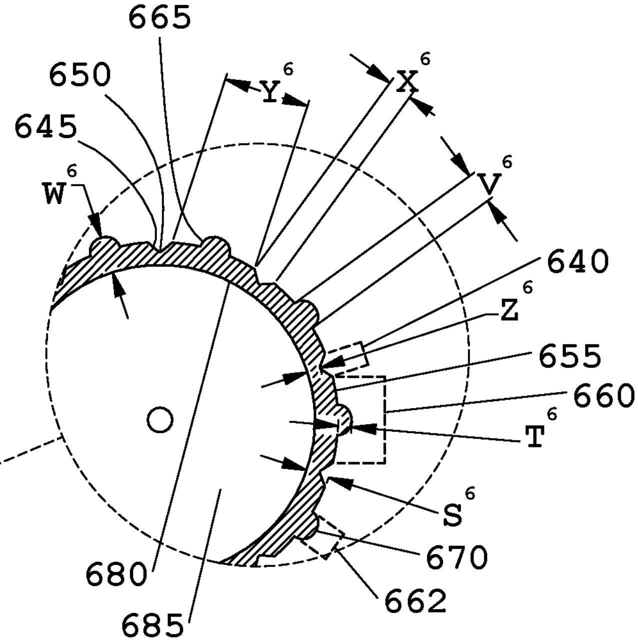
Fig. 25
Fig. 26
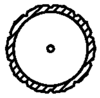
SECTION B6-B6

Fig. 27A
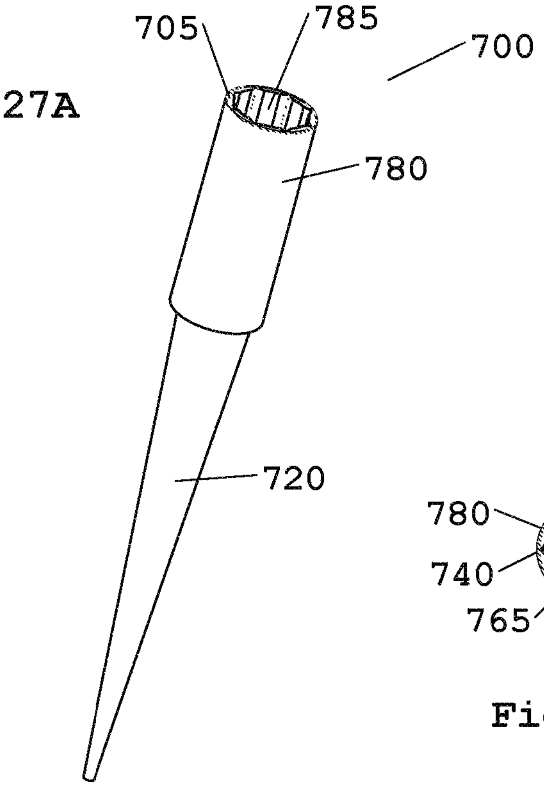
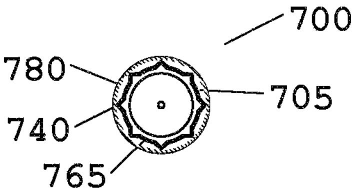
Fig. 27C
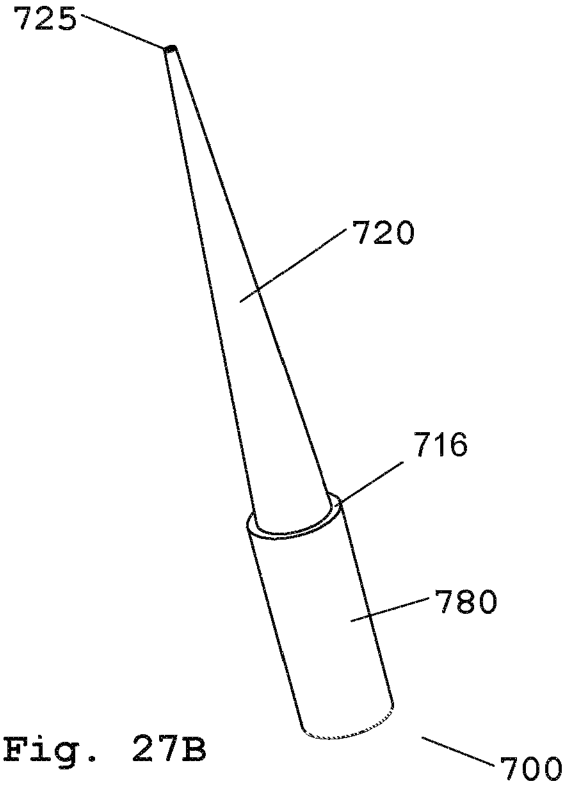
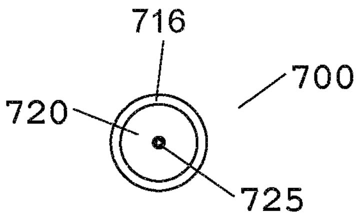
Fig. 27D
Fig. 27B

Fig. 27E
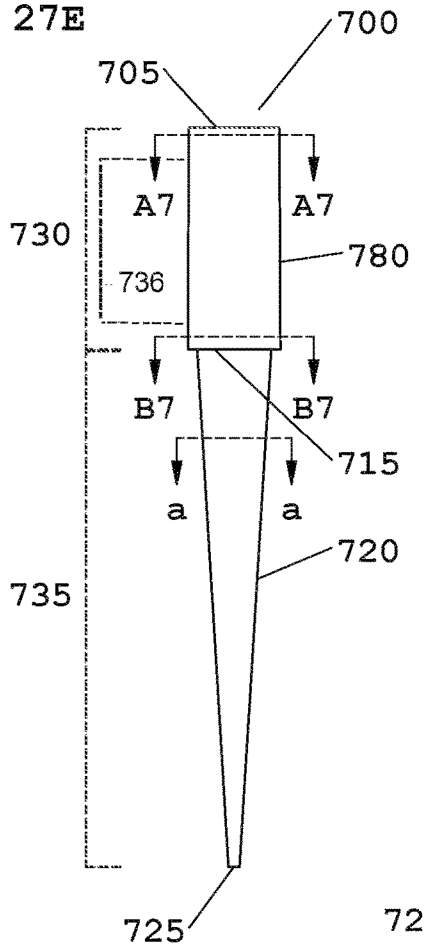
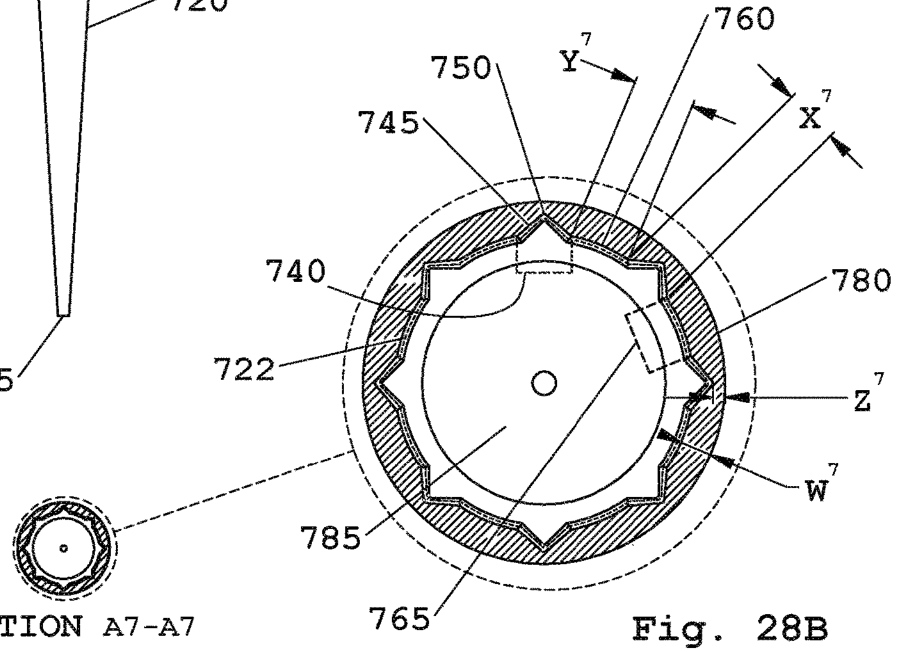
Fig. 28A
SECTION A7-A7
Fig. 28B
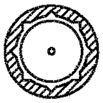
Fig. 29
SECTION B7-B7
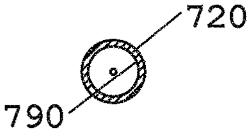
Fig. 30
SECTION a-a Fig. 31
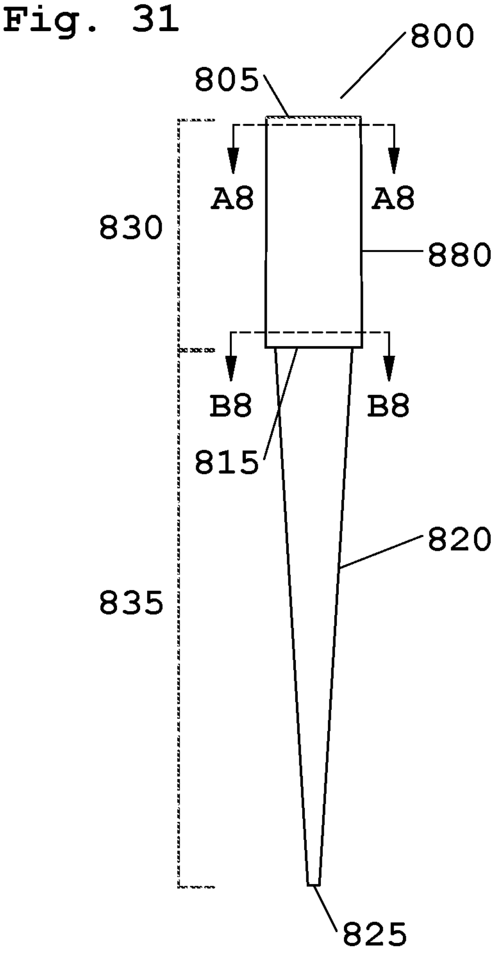
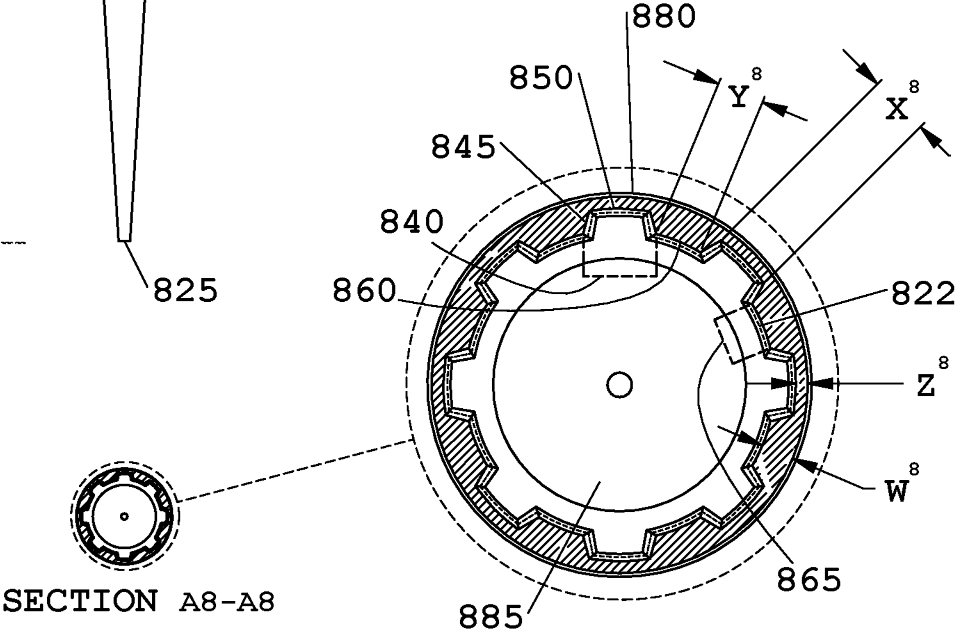
Fig. 32
SECTION A8-A8
Fig. 33
Fig. 34
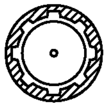
SECTION B8-B8

Fig. 35
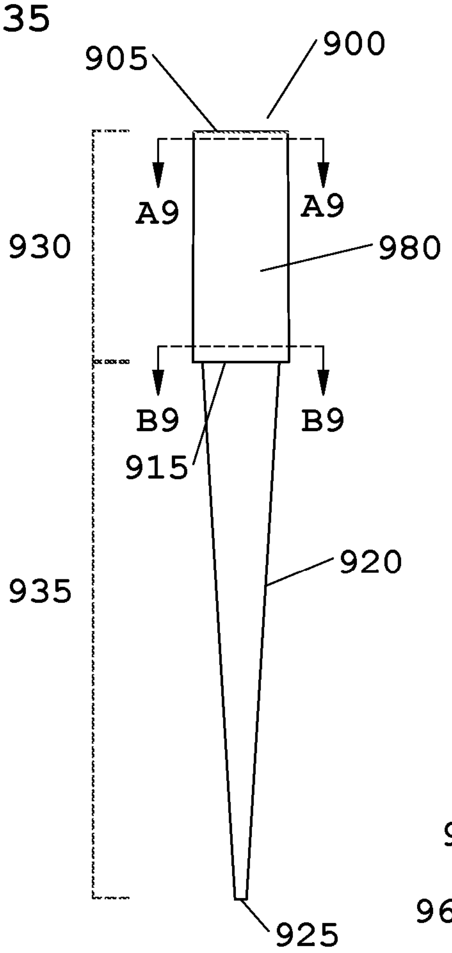
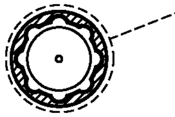
Fig. 36
SECTION A9-A9
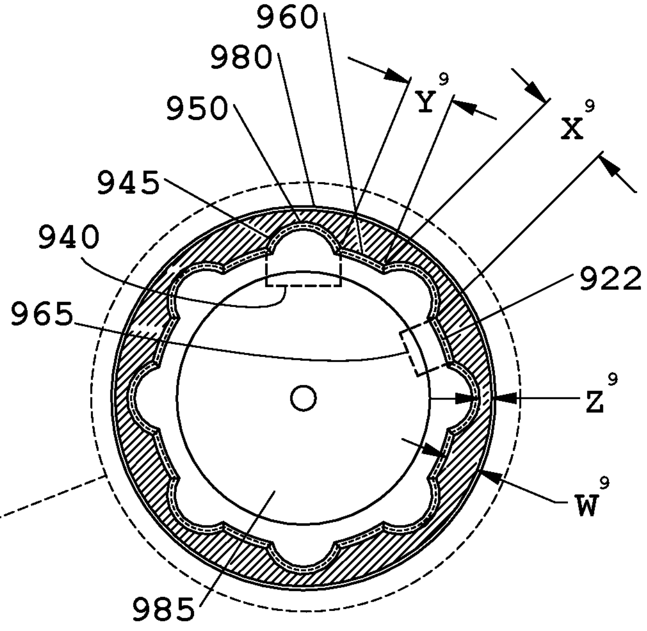
Fig. 37
Fig. 38
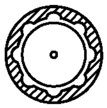
SECTION B9-B9

ERGONOMIC PIPETTE TIPS

RELATED PATENT APPLICATIONS

This patent application is continuation of U.S. application Ser. No. 16/934,878 filed on Jul. 21, 2020, entitled ERGONOMIC PIPETTE TIPS, naming Peter Paul Blaszcak and Arta Motadel as inventors, which is a continuation of U.S. application Ser. No. 16/609,913 filed on Oct. 31, 2019, entitled ERGONOMIC PIPETTE TIPS, naming Peter Paul Blaszcak and Arta Motadel as inventors, which is a 35 U.S.C. 371 national phase patent application of PCT/US2018/O32590, filed on May 14, 2018, entitled ERGONOMIC PIPETTE TIPS, naming Peter Paul Blaszcak and Arta Motadel as inventors, which claims the benefit of U.S. provisional patent application no. 62/507,381 filed May 17, 2017, entitled ERGONOMIC PIPETTE TIPS, naming Peter Paul Blaszcak and Arta Motadel as inventor. The entire content of the foregoing patent application is incorporated herein by reference for all purposes, including all text, tables and drawings.

FIELD

The technology relates in part to pipette tips and methods for using them.

BACKGROUND

Pipette tips are utilized in a variety of industries that have a requirement for handling fluids, and are used in facilities including medical laboratories and research laboratories, for example. In many instances pipette tips are used in large numbers, and often are utilized for processing many samples and/or adding many reagents to samples, for example.

Pipette tips often are substantially cone-shaped with an aperture at one end that can engage a fluid dispensing device, and another relatively smaller aperture at the other end that can receive and emit fluid. Pipette tips generally are manufactured from a moldable plastic, such as polypropylene, for example. Pipette tips are made in a number of sizes to allow for accurate and reproducible liquid handling for volumes ranging from nanoliters to milliliters.

Pipette tips can be utilized in conjunction with a variety of fluid dispensing devices, including manual dispensers (e.g., pipettors) and automated dispensers to manipulate liquid samples. A fluid dispenser is a device that, when attached to the upper end of a pipette tip (the larger opening end), applies negative pressure to acquire fluids, and applies positive pressure to dispense fluids. Typically a pipette tip is mounted onto the lower or distal portion of a fluid dispenser (typically referred to as the barrel, nozzle or mounting shaft) by either inserting the distal portion of a fluid dispenser into the interior of a pipette tip or positioning the distal portion of a fluid dispenser around the pipette tip exterior. A distal portion of a dispenser is inserted into the interior of the upper end of a pipette tip with an amount of force sufficient to cause a pipette tip wall to expand, creating a seal between an outer surface of the distal portion of the dispenser and an inner surface of a pipette tip. Alternatively, a distal portion of a dispenser is inserted around the upper end of a pipette tip with an amount of force sufficient to cause a pipette tip wall to compress, creating a seal between an inner surface of the distal portion of the dispenser and an outer surface of a pipette tip.

SUMMARY

Provided in certain aspects are pipette tips having proximal regions with features that facilitate wall expansion (expansion sealing tips) or wall compression (compression sealing tips) when a pipette tip is mounted onto and sealingly engages with the appropriately designed liquid dispensing device member. Incorporating such features in a pipette tip proximal region can reduce the amount of axial force required to engage and/or disengage a pipette tip from a fluid dispenser.

Provided in certain aspects is a pipette tip that includes an exterior surface, an interior surface, a proximal region, a distal region and a junction between a proximal region and a distal region. In certain aspects, an interior surface of a pipette tip defines a substantially frustum-shaped void and is substantially smooth and uniform (expansion sealing tip).

In certain aspects, a pipette tip includes an annular flange at a proximal terminus of a proximal region. A pipette tip often includes a distal shoulder at a junction between a proximal region and a distal region.

A proximal region often includes a plurality of longitudinally-oriented grooves on an exterior surface of a pipette tip. A groove typically has a groove width and a groove floor. A proximal region also often includes a plurality of longitudinally-oriented panels on an exterior surface of a pipette tip, where each of the panels is adjacent to one of the grooves. A panel typically includes a panel sidewall, a panel face and a panel width. A pipette tip typically includes a sealing zone on an interior surface of a pipette tip. Grooves and panels or portions thereof usually extend over a sealing zone. In certain aspects, grooves on an exterior surface of a pipette tip extend from a flange to a shoulder. In certain aspects, panels on an exterior surface of a pipette tip extend from a flange to a shoulder. In certain aspects, one or more panels include a protrusion on a panel face. A protrusion typically has a protrusion face and a transition surface between a panel face and a protrusion face.

In certain aspects, a panel width is greater than a groove width. In certain aspects, a distance between a groove floor and an interior surface of a pipette tip opposite the groove floor, for each groove, is less than a distance between a panel face and an interior surface of the pipette tip opposite the panel face, for each panel.

In some aspects, a distal region of a pipette tip has a continuous taper of a pipette tip wall surface to form an edge or boundary of minimal thickness. In certain aspects, a distal region of a pipette tip has a wall thickness that tapers from (a) a point at or between (i) about a junction of a proximal region and distal region to (ii) about one-quarter of the axial distance from a terminus of the distal region to the junction, to (b) a distal region terminus, and a wall thickness at the distal region terminus is about 0.0030 inches to about 0.0055 inches.

In certain aspects, an interior surface of a pipette tip has an annular groove.

Provided in certain aspects is a pipette tip that includes an exterior surface, an interior surface, a proximal region, a distal region and a junction between a proximal region and a distal region. In certain aspects, an exterior surface of a pipette tip proximal region is substantially cylindrical and is substantially smooth and uniform (compression sealing tip).

A pipette tip often includes a distal shoulder at a junction between a proximal region and a distal region.

A proximal region often includes a plurality of longitudinally-oriented grooves on an interior surface of a pipette tip. A groove typically has a groove width and a groove floor. A proximal region also often includes a plurality of longitudinally-oriented panels on an interior surface of a pipette tip, where each of the panels is adjacent to one of the groove. A panel typically includes a panel sidewall, a panel face and a panel width. A pipette tip typically includes a sealing zone on an exterior surface of a pipette tip. Grooves and panels or portions thereof usually extend over a sealing zone. In certain aspects, grooves on an interior surface of a pipette tip extend from a proximal end of a proximal region to a shoulder. In certain aspects, panels on an interior surface of a pipette tip extend from a proximal end of a proximal region to a shoulder. In certain aspects, one or more panels include a protrusion on a panel face. A protrusion typically has a protrusion face and a transition surface between a panel face and a protrusion face.

A panel width is typically greater than a groove width. In certain aspects, a distance between a groove floor and an exterior surface of a pipette tip opposite the groove floor, for each groove, is less than a distance between a panel face and an exterior surface of a pipette tip opposite a panel face.

In certain aspects, an interior surface of a pipette tip has an annular groove.

In some aspects, a distal region of a pipette tip has a continuous taper of a pipette tip wall surface to form an edge or boundary of minimal thickness. In certain aspects, a distal region of a pipette tip has a wall thickness that tapers from (a) a point at or between (i) about a junction of a proximal region and distal region to (ii) about one-quarter of the axial distance from a terminus of the distal region to the junction, to (b) a distal region terminus, and a wall thickness at the distal region terminus is about 0.0030 inches to about 0.0055 inches.

Also provided in certain aspects are methods for manufacturing pipette tips described herein, and molds used in manufacturing processes. Provided also in certain aspects are methods for using pipette tips described herein.

Certain embodiments are described further in the following description, examples, claim(s) and drawings.

BRIEF DESCRIPTION OF THE DRAWINGS

The drawings illustrate certain embodiments of the technology and are not limiting. For clarity and ease of illustration, the drawings are not necessarily made to scale and, in some instances, various aspects may be shown exaggerated or enlarged to facilitate an understanding of particular embodiments.

FIG. 1 shows a side view of pipette tip embodiment 100. FIG. 4A is a sectional view through section A1-A1 shown in FIG. 1, and FIG. 4B is an enlarged view of the region delineated by the broken line circle in FIG. 4A. FIG. 5 is a sectional view through section B1-B1 shown in FIG. 1, and FIG. 6 is a sectional view through section a-a shown in FIG. 1.

FIG. 7 shows a side view of pipette tip embodiment 200. FIG. 8 is a sectional view through section A2-A2 shown in FIG. 7, and FIG. 9 is an enlarged view of the region delineated by the broken line circle in FIG. 8. FIG. 10 is a sectional view through section B2-B2 shown in FIG. 7.

FIG. 11 shows a side view of pipette tip embodiment 300. FIG. 12 is a sectional view through section A3-A3 shown in FIG. 11, and FIG. 13 is an enlarged view of the region delineated by the broken line circle in FIG. 12. FIG. 14 is a sectional view through section B3-B3 shown in FIG. 11.

FIG. 15 shows a side view of pipette tip embodiment 400. FIG. 16 is a sectional view through section A4-A4 shown in FIG. 15, and FIG. 17 is an enlarged view of the region delineated by the broken line circle in FIG. 16. FIG. 18 is a sectional view through section B4-B4 shown in FIG. 15.

FIG. 19 shows a side view of pipette tip embodiment 500. FIG. 20 is a sectional view through section A5-A5 shown in FIG. 19, and FIG. 21 is an enlarged view of the region delineated by the broken line circle in FIG. 20. FIG. 22 is a sectional view through section B5-B5 shown in FIG. 19.

FIG. 23 shows a side view of pipette tip embodiment 600. FIG. 24 is a sectional view through section A6-A6 shown in FIG. 23, and FIG. 25 is an enlarged view of the region delineated by the broken line circle in FIG. 24. FIG. 26 is a sectional view through section B6-B6 shown in FIG. 23.

FIG. 27A shows a top perspective view, FIG. 27B shows a bottom perspective view, FIG. 27C shows a top view, FIG. 27D shows a bottom view, and FIG. 27E shows a side view, of pipette tip embodiment 700. FIG. 28A is a sectional view through section A7-A7 shown in FIG. 27E, and FIG. 28B is an enlarged view of the region delineated by the broken line circle in FIG. 28A. FIG. 29 is a sectional view through section B7-B7 shown in FIG. 27E, and FIG. 30 is a sectional view through section a-a shown in FIG. 27E.

FIG. 31 shows a side view of pipette tip embodiment 800. FIG. 32 is a sectional view through section A8-A8 shown in FIG. 31, and FIG. 33 is an enlarged view of the region delineated by the broken line circle in FIG. 32. FIG. 34 is a sectional view through section B8-B8 shown in FIG. 31.

FIG. 35 shows a side view of pipette tip embodiment 900. FIG. 36 is a sectional view through section A9-A9 shown in FIG. 35, and FIG. 37 is an enlarged view of the region delineated by the broken line circle in FIG. 36. FIG. 38 is a sectional view through section B9-B9 shown in FIG. 35.

FIG. 39A contains detail (indicated by the circle B) illustrated in FIG. 39B.

Figure 2A:
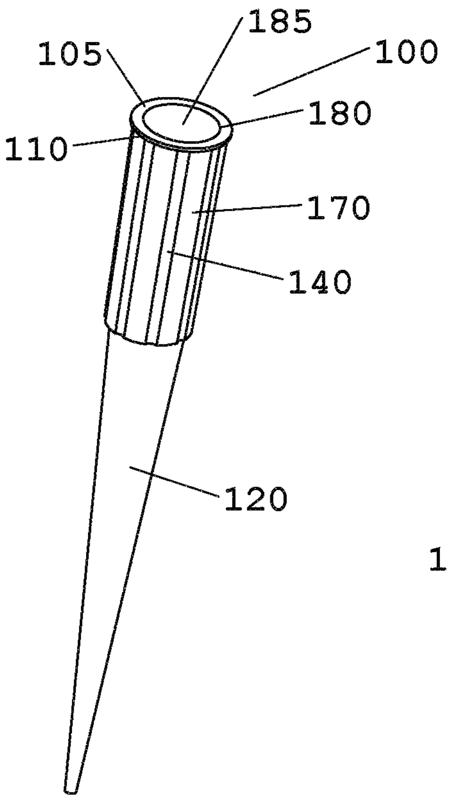
FIG. 2A shows a top perspective view.
Figure 3A:
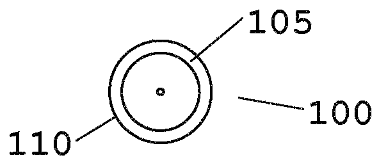
FIG. 3A shows a top view and FIG. 3B shows a bottom view of pipette tip embodiment 100.

Certain features in the drawings are summarized in Table 1.

TABLE 1

| Identifier | Feature |
|---|---|
| 100 | pipette tip (expansion sealing) |
| 105 | proximal region proximal terminus |
| 110 | annular flange |
| 112 | longitudinal axis; longitudinal orientation |
| 113 | circumference; latitudinal orientation |
| 115 | junction between proximal region and distal region |
| 116 | proximal region distal terminus; shoulder |
| 120 | distal region exterior surface |
| 122 | proximal region exterior surface |
| 125 | distal region distal terminus |
| 130 | proximal region |
| 135 | distal region |
| 136 | sealing zone |
| 140 | groove |
| 150 | groove floor |
| $X^1$ | groove width |
| $Z^1$ | distance between a groove floor and an interior surface of a pipette tip opposite a groove floor; pipette tip wall thickness at a groove |
| 160 | panel face |
| 145 | panel sidewall |
| 170 | panel |
| $Y^1$ | panel width |
| $W^1$ | distance between a panel face and an interior surface of a pipette tip opposite a panel face; pipette tip wall thickness at a panel |
| 180 | proximal region interior surface |
| 185 | interior region of tip |
| 190 | distal region interior surface |

TABLE 1-continued

| Identifier | Feature |
|---|---|
| 200 | pipette tip (expansion sealing) |
| 205 | proximal region proximal terminus |
| 210 | annular flange |
| 215 | junction between proximal region and distal region |
| 220 | distal region exterior surface |
| 222 | proximal region exterior surface |
| 225 | distal region distal terminus |
| 230 | proximal region |
| 235 | distal region |
| 240 | groove |
| 250 | groove floor |
| $X^2$ | groove width |
| $Z^2$ | distance between a groove floor and an interior surface of a pipette tip opposite a groove floor; pipette tip wall thickness at a groove |
| 260 | panel face |
| 270 | panel |
| 245 | panel sidewall |
| $Y^2$ | panel width |
| $W^2$ | distance between a panel face and an interior surface of a pipette tip opposite a panel face; pipette tip wall thickness at a panel |
| 280 | interior surface |
| 285 | proximal region interior |
| 300 | pipette tip (expansion sealing) |
| 305 | proximal region proximal terminus |
| 310 | annular flange |
| 315 | junction between proximal region and distal region |
| 320 | distal region exterior surface |
| 322 | proximal region exterior surface |
| 325 | distal region distal terminus |
| 330 | proximal region |
| 335 | distal region |
| 340 | groove |
| 350 | groove floor |
| $X^3$ | groove width |
| $Z^3$ | distance between a groove floor and an interior surface of a pipette tip opposite a groove floor; pipette tip wall thickness at a groove |
| 360 | panel face |
| 370 | panel |
| 345 | panel sidewall |
| $Y^3$ | panel width |
| $W^3$ | distance between a panel face and an interior surface of a pipette tip opposite a panel face; pipette tip wall thickness at a panel |
| 380 | interior surface |
| 385 | proximal region interior |
| 400 | pipette tip (expansion sealing) |
| 405 | proximal region proximal terminus |
| 410 | annular flange |
| 415 | junction between proximal region and distal region |
| 420 | distal region exterior surface |
| 422 | proximal region exterior surface |
| 425 | distal region distal terminus |
| 430 | proximal region |
| 435 | distal region |
| 440 | groove |
| 450 | groove floor |
| $X^4$ | groove width |
| $Z^4$ | distance between a groove floor and an interior surface of a pipette tip opposite a groove floor; pipette tip wall thickness at a groove |
| 455 | panel face |
| 445 | panel sidewall |
| 460 | panel comprising protrusion |
| $Y^4$ | panel width |
| $W^4$ | distance between a protrusion face and an interior surface of a pipette tip opposite a panel face with the protrusion |
| $S^4$ | distance between a panel face and an interior surface of a pipette tip opposite a panel face; pipette tip wall thickness at a panel |
| 462 | protrusion |
| 465 | transition surface; protrusion step from panel |
| 470 | protrusion face |
| $T^4$ | distance between panel face and protrusion face |
| $V^4$ | protrusion width |
| 480 | interior surface |

TABLE 1-continued

| Identifier | Feature |
|---|---|
| 485 | proximal region interior |
| 500 | pipette tip (expansion sealing) |
| 505 | proximal region proximal terminus |
| 510 | annular flange |
| 515 | junction between proximal region and distal region |
| 520 | distal region exterior surface |
| 522 | proximal region exterior surface |
| 525 | distal region distal terminus |
| 530 | proximal region |
| 535 | distal region |
| 540 | groove |
| $X^5$ | groove width |
| $Z^5$ | distance between a groove floor and an interior surface of a pipette tip opposite a groove floor; pipette tip wall thickness at a groove |
| 550 | groove floor |
| 555 | panel face |
| 545 | panel sidewall |
| 560 | panel comprising protrusion |
| $Y^5$ | panel width |
| $W^5$ | distance between a protrusion face and an interior surface of a pipette tip opposite a panel face with the protrusion |
| $S^5$ | distance between a panel face and an interior surface of a pipette tip opposite a panel face; pipette tip wall thickness at a panel |
| 562 | protrusion |
| 565 | transition surface; protrusion step from panel |
| 570 | protrusion face |
| $T^5$ | distance between panel face and protrusion face |
| $V^5$ | protrusion width |
| 580 | interior surface |
| 585 | proximal region interior |
| 600 | pipette tip (expansion sealing) |
| 605 | proximal region proximal terminus |
| 610 | annular flange |
| 615 | junction between proximal region and distal region |
| 620 | distal region exterior surface |
| 622 | proximal region exterior surface |
| 625 | distal region distal terminus |
| 630 | proximal region |
| 635 | distal region |
| 640 | groove |
| $X^6$ | groove width |
| $Z^6$ | distance between a groove floor and an interior surface of a pipette tip opposite a groove floor; pipette tip wall thickness at a groove |
| 650 | groove floor |
| 655 | panel face |
| 645 | panel sidewall |
| $Y^6$ | panel width |
| $W^6$ | distance between a protrusion face and an interior surface of a pipette tip opposite a panel face with the protrusion |
| $S^6$ | distance between a panel face and an interior surface of a pipette tip opposite a panel face; pipette tip wall thickness at a panel |
| 660 | panel comprising protrusion |
| 662 | protrusion |
| 665 | transition surface from panel face |
| 670 | protrusion face |
| $T^6$ | distance between panel face and protrusion face |
| $V^6$ | protrusion width |
| 680 | interior surface |
| 685 | proximal region interior |
| 700 | pipette tip (compression sealing) |
| 705 | proximal region proximal terminus |
| 715 | junction between proximal region and distal region |
| 716 | proximal region distal terminus; shoulder |
| 720 | distal region exterior surface |
| 722 | proximal region interior surface |
| 725 | distal region distal terminus |
| 730 | proximal region |
| 735 | distal region |
| 736 | sealing zone |
| 740 | groove |
| $X^7$ | groove width |
| $Z^7$ | distance between a groove floor and an exterior surface of a pipette tip opposite a groove floor; pipette tip wall thickness at a groove |

TABLE 1-continued

| Identifier | Feature |
|---|---|
| 750 | groove floor |
| 760 | panel face |
| 765 | panel |
| 745 | panel sidewall |
| $Y^7$ | panel width |
| $W^7$ | distance between a panel face and an exterior surface of a pipette tip opposite a panel face; pipette tip wall thickness at a panel |
| 780 | proximal region exterior surface |
| 785 | proximal region interior |
| 790 | distal region interior surface |
| 800 | pipette tip (compression sealing) |
| 805 | proximal region proximal terminus |
| 815 | junction between proximal region and distal region |
| 820 | distal region exterior surface |
| 822 | proximal region interior surface |
| 825 | distal region distal terminus |
| 830 | proximal region |
| 835 | distal region |
| 840 | groove |
| $X^8$ | groove width |
| $Z^8$ | distance between a groove floor and an exterior surface of a pipette tip opposite a groove floor; pipette tip wall thickness at a groove |
| 850 | groove floor |
| 860 | panel face |
| 865 | panel |
| 845 | panel sidewall |
| $Y^8$ | panel width |
| $W^8$ | distance between a panel face and an exterior surface of a pipette tip opposite a panel face; pipette tip wall thickness at a panel |
| 880 | proximal region exterior surface |
| 885 | proximal region interior |
| 900 | pipette tip (compression sealing) |
| 905 | proximal region proximal terminus |
| 915 | junction between proximal region and distal region |
| 920 | distal region exterior surface |
| 922 | proximal region interior surface |
| 925 | distal region distal terminus |
| 930 | proximal region |
| 935 | distal region |
| 940 | groove |
| $X^9$ | groove width |
| $Z^9$ | distance between a groove floor and an exterior surface of a pipette tip opposite a groove floor; pipette tip wall thickness at a groove |
| 950 | groove floor |
| 960 | panel face |
| 965 | panel |
| 945 | panel sidewall |
| $Y^9$ | panel width |
| $W^9$ | distance between a panel face and an exterior surface of a pipette tip opposite a panel face; pipette tip wall thickness at a panel |
| 980 | proximal region exterior surface |
| 985 | proximal region interior |
| 1000 | distal region |
| 1010 | distal terminus |
| 1020 | taper angle of pipette tip wall reaches zero degrees |
| 1030 | distal terminus region wall thickness |

DETAILED DESCRIPTION

Provided in part herein are pipette tip embodiments that permit ergonomic engagement and disengagement of a pipette tip and a fluid dispensing device (i.e., reduce the amount of axial force required to engage and/or disengage a pipette tip from a fluid dispensing device).

Certain structural features of pipette tip embodiments described herein may afford particular advantages to some users. In some embodiments, one or more of the structural features described may be incorporated into a pipette tip embodiment in one or more combinations. Incorporation of a structural feature can result in an advantage described hereafter, in certain instances.

Many features of the pipette tip embodiments described herein are shared between the different pipette tip embodiments (see Table 1). Therefore, the features will be described in detail for one pipette tip embodiment and related to the similar features of other pipette tip embodiments.

Ergonomic Pipette Tip Groove and Panel Configurations

Expansion Sealing Tips

Provided in certain embodiments are pipette tips that includes an exterior surface, an interior surface, a proximal region, a distal region and a junction between the proximal region and the distal region. A proximal region often includes a plurality of longitudinally-oriented grooves on an exterior surface of a pipette tip (e.g., 140 as shown in FIG. 1). A proximal region also often includes a plurality of longitudinally-oriented panels on an exterior surface of a pipette tip (e.g., 170 as shown in FIG. 1), where each of the panels is adjacent to one of the grooves. The length of longitudinally-oriented panels and grooves is larger than the width of such panels and grooves. The length of longitudinally-oriented grooves and panels typically is parallel or substantially parallel to a longitudinal axis of the pipette tip (e.g., longitudinal axis 112 shown in FIG. 2B). The length of a groove or panel that is substantially parallel to a longitudinal axis can deviate from parallel by about 10 degrees or less. The longitudinally-oriented panel sidewall of adjacent panels typically define each groove there between, and there typically is an equal number of grooves and panels in a pipette tip.

In some embodiments, a pipette tip comprises a set of axially extended grooves and panels circumferentially spaced around the external surface of the proximal region of the pipette tip. The term “circumferentially spaced,” “circumferentially configured”, “circumferentially disposed” and the like as used herein, refer to axially oriented grooves and panels disposed around a circumference of the proximal region of a pipette tip (e.g., circumference latitudinal axis 113 shown in FIG. 2B).

In some embodiments, two or more panels are regularly distributed around the exterior surface of a pipette tip, and in certain embodiments, all panels are regularly distributed around the exterior surface of a pipette tip (e.g., all grooves have the same groove width). In some embodiments, two or more panels are asymmetrically distributed around the exterior surface of a pipette tip. In some embodiments, two or more grooves are regularly distributed around the exterior surface of a pipette tip, and in certain embodiments, all grooves are regularly distributed around the exterior surface of a pipette tip (e.g., all panels have the same panel width). In some embodiments, two or more grooves are asymmetrically distributed around the exterior surface of a pipette tip.

The interior surface of a pipette tip typically defines a substantially frustum-shaped void and is substantially smooth and uniform (i.e., not interrupted by a protrusion or cavity; follows the contours of a nozzle or shaft with which it seals).

A pipette tip typically includes a sealing zone. In certain embodiments, the proximal region comprises a sealing zone (e.g., 136 as shown in FIG. 1). A terminus of a fluid dispensing device often sealingly engages an inner surface of a pipette tip at a sealing zone, which generally is located a particular distance from a proximal terminus of a pipette tip. Thus, a sealing zone in certain embodiments is disposed a particular distance below the terminal opening of a pipette tip (e.g., the sealing zone is offset from the edge of the pipette tip). A sealing zone often is a point at which a fluid tight, frictional and/or sealing engagement occurs between a pipette tip and a fluid dispensing device. In some embodiments, the inner surface of the proximal region of a pipette tip provides a continuous contact zone (e.g., sealing zone) for frictional and/or sealing engagement between a pipette tip and a fluid dispensing device member. Grooves and panels or portions thereof usually extends over the sealing zone.

Certain pipette tip embodiments can include a flared lead-in surface at the end of a proximal region. In certain aspects, a pipette tip includes a flange (e.g., annular flange) at a proximal terminus of a proximal region. In such embodiments, a flange may be flared, and a lead-in diameter of a flange can allow for dispenser engagement tolerance, which is relevant for multi-dispenser applications, for example. Such a flange can provide a larger contact zone for engaging a pipette nozzle or mounting shaft, and can increase the probability of a sealing engagement between a dispenser nozzle or mounting shaft not coaxially aligned with a pipette tip by guiding the axial center of a pipette tip to the axial center of a dispenser nozzle or mounting shaft. An annular flange also can provide pipette tip rigidity in addition to facilitating dispenser alignment. In some embodiments, pipette tips described herein include an annular flange at a proximal terminus of the proximal region. An example of an annular flange 110 is illustrated in FIGS. 1 and 2A.

A pipette tip often includes a distal shoulder at the junction between the proximal region and the distal region (e.g., 115 as shown in FIG. 1).

Figure 2B:
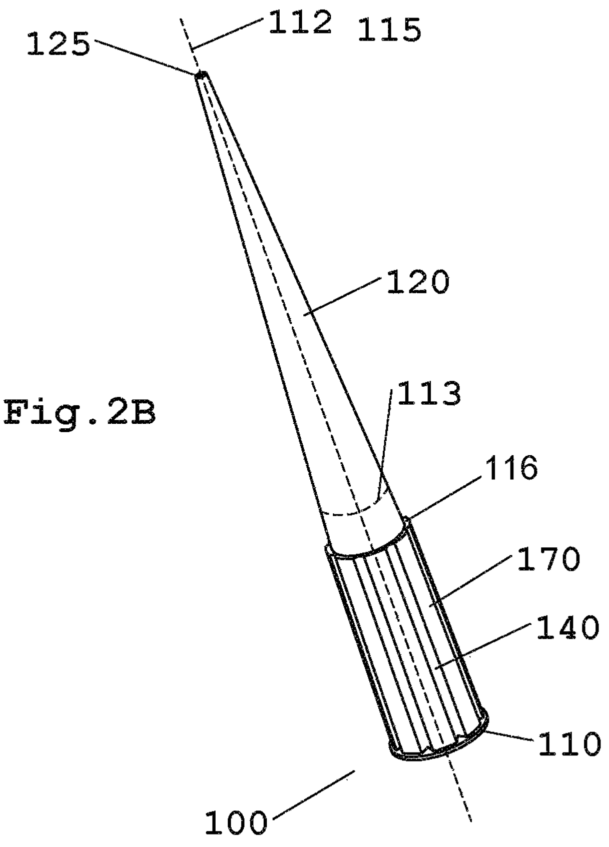
FIG. 2B shows a bottom perspective view.
Figure 3B:
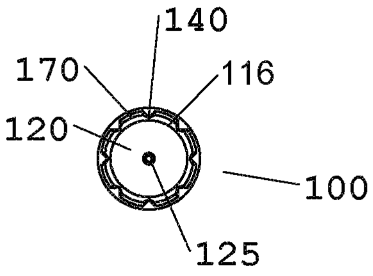

Grooves and panels often extend from an annular flange (e.g., 110 as shown in FIG. 1) to a distal terminal shoulder (e.g., 116 as shown in FIG. 2B).

An exterior surface of a pipette tip can include any suitable number of panels and grooves. A pipette tip sometimes includes 3 or more grooves (e.g., 3 to about 50 grooves; 3 to about 40 grooves; 4 to about 40 grooves; about 5 to about 40 grooves; about 6 to about 40 grooves; about 7 to about 40 grooves; about 8 to about 40 grooves; about 9 to about 40 grooves; about 10 to about 40 grooves; about 10 to about 30 grooves; about 8 to about 20 grooves, about 4 to about 14 grooves; about 6 to about 10 grooves; about 8 to about 10 grooves; about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 grooves) and sometimes includes 3 or more panels (e.g., 3 to about 50 panels; 3 to about 40 panels; 4 to about 40 panels; about 5 to about 40 panels; about 6 to about 40 panels; about 7 to about 40 panels; about 8 to about 40 panels; about 9 to about 40 panels; about 10 to about 40 panels; about 10 to about 30 panels; about 8 to about 20 panels; about 4 to about 14 panels; about 6 to about 10 panels; about 8 to about 10 panels; about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 panels). For example, FIG. 4A shows a pipette tip with 8 grooves and 8 panels.

A groove often includes a groove floor (e.g., 150 as shown in FIG. 4B) that can run the longitudinal length of the groove and a groove width X (e.g., $X^1$ as shown in FIG. 4B). In certain embodiments, a groove is defined by adjacent panel sidewalls and a groove floor. A groove floor is determined by the latitudinal profile (see discussion below) of a groove and in certain embodiments a groove floor can be a point or substantially a point, flat or curved. A curved surface sometimes includes a concave curve, sometimes includes a convex curve, sometimes is a single curve (i.e., one arc), and sometimes is a compound curve (i.e., two or more arcs). A groove floor is disposed so there is a distance Z between the groove floor and an interior surface of a pipette tip opposite the groove floor (e.g., $Z^1$ shown in FIG. 4B) (i.e., wall thickness of a pipette tip at a groove). In some embodiments, Z represents the smallest distance between a groove floor or a portion thereof and an interior surface of a pipette tip opposite the groove floor or portion thereof. For example, for a groove having a curved groove floor, the pipette tip wall under the groove would vary in thickness across the groove floor. Z represents the distance between the lowest point of the curved surface (inflection point) and an interior surface of a pipette tip opposite the groove floor (e.g., see $Z^3$ shown in FIG. 13).

In certain embodiments, a distance Z between a groove floor and an interior surface of a pipette tip opposite the groove floor, for each groove, is less than a distance W between a panel face and an interior surface of a pipette tip opposite the panel face (e.g., $W^1$ as shown in FIG. 4B), for each panel. A distance Z between a groove floor and an interior surface of a pipette tip opposite the groove floor sometimes is about 0.001 inches to about 0.012 inches (e.g., about 0.002 inches to about 0.010 inches; about 0.003 inches to about 0.007 inches; about 0.004 inches to about 0.006 inches; about 0.004 inches to about 0.005 inches; about 0.001 inches, about 0.002 inches, about 0.003 inches, about 0.004 inches, about 0.005 inches, about 0.006 inches, about 0.007 inches, about 0.008 inches, about 0.009 inches, about 0.010 inches, about 0.011 inches or about 0.012 inches). A distance between a groove floor and an interior surface of a pipette tip opposite the groove floor is often about 0.012 inches or less, about 0.011 inches or less, about 0.010 inches or less, about 0.009 inches or less, about 0.008 inches or less, about 0.007 inches or less, about 0.006 inches or less, about 0.005 inches or less, about 0.004 inches or less, about 0.003 inches or less, about 0.002 inches or less, about 0.001 inches or less.

A "minimal thickness" for a pipette tip wall at a groove floor may predominately be a reflection of the limits of current and future manufacturing and molding capabilities. Factors such as plastic viscosity and flow characteristics, as well as plastic hardeners (e.g., currently available plasticizers or hardeners, or plasticizers yet to be formulated) also may contribute to the minimal thickness attainable for pipette tips described herein. Therefore, thicknesses described herein for pipette tip walls between a groove floor and an interior surface of a pipette tip opposite the groove wall sometimes are at the current limit of molding and manufacturing technology, and it is possible that future molding, manufacturing and plastics technology will result in lesser thicknesses.

Two or more or all grooves in a pipette tip often have the same distance (wall thickness) between a groove floor and an interior surface of a pipette tip opposite the groove floor.

Two or more grooves in a pipette tip sometimes have a different distance (wall thickness) between a groove floor and an interior surface of a pipette tip opposite the groove floor. In some embodiments, the distance from an interior surface of a pipette tip opposite a groove floor (e.g., $Z^1$ shown in FIG. 4B) (i.e., wall thickness of the pipette tip at a groove) along a longitudinal length of a groove sometimes is uniform or substantially uniform (i.e., a substantially uniform thickness changes 5% or less across the longitudinal length).

A panel often includes a panel face (e.g., 160 as shown in FIG. 4B), a panel sidewall (e.g., 145 as shown in FIG. 4B) and a panel width Y (e.g., $Y^1$ as shown in FIG. 4B). In certain embodiments, a panel is disposed so as to have a distance W between a panel face and an interior surface of a pipette tip opposite the panel face (e.g., $W^1$ shown in FIG. 4B) (i.e., wall thickness of a pipette tip at a panel). A distance W between a panel face and an interior surface of a pipette tip opposite the panel face sometimes is about 0.010 inches to about 0.040 inches (e.g., about 0.010 inches to about 0.030 inches, about 0.010 inches to about 0.020 inches; about 0.015 inches to about 0.030 inches; about 0.015 inches to about 0.020 inches about 0.018 inches to about 0.020 inches; about 0.010 inches, about 0.011 inches, about 0.012 inches, about 0.013 inches, about 0.014 inches, about 0.015 inches, about 0.016 inches, about 0.017 inches, about 0.018 inches, about 0.019 inches, about 0.020 inches, about 0.021 inches, about 0.022 inches, about 0.023 inches, about 0.024 inches, about 0.025 inches, about 0.026 inches, about 0.027 inches, about 0.028 inches, about 0.029 inches, about 0.030 inches, about 0.031 inches, about 0.032 inches, about 0.033 inches, about 0.034 inches, about 0.035 inches, about 0.036 inches, about 0.037 inches, about 0.038 inches, about 0.039 inches or about 0.040 inches). Two or more or all panels in a pipette tip often have the same distance (wall thickness) between a panel face and an interior surface of a pipette tip opposite the panel face. Two or more panels in a sealing member sometimes have a different distance between a panel face and an interior surface of a pipette tip opposite the panel face, and sometimes there are 2, 3, 4, 5 or more different panel wall thickness species in a pipette tip that can be arranged in a suitable pattern (e.g., alternating pattern or grouped pattern).

In certain embodiments, the distance between a panel face and an interior surface of a pipette tip opposite a panel face (e.g., W 1 shown in FIG. 4B) (i.e., wall thickness of a pipette tip at a panel) along a longitudinal length of a panel sometimes is uniform or substantially uniform (i.e., a substantially uniform thickness changes 5% or less across the longitudinal length).

In some embodiments, W (pipette tip wall thickness at a panel) can be about 2 to about 50 times greater than Z (pipette tip wall thickness under a groove), about 2 to about 40 times greater, about 2 to about 30 times greater, about 2 to about 20 times greater, about 2 to about 10 times greater (e.g., about 2 times greater; about 3 times greater; about 4 times greater; about 5 times greater; about 6 times greater; about 7 times greater; about 8 times greater; about 9 times greater; about 10 times greater, about 11 times greater, about 12 times greater, about 13 times greater, about 14 times greater, about 15 times greater, about 16 times greater, about 17 times greater, about 18 times greater, about 19 times greater, about 20 times greater, about 25 times greater, about 30 times greater, about 35 times greater, about 40 times greater, about 45 times greater or about 50 times greater).

A width of a panel (Y) or a groove (X) typically is measured perpendicular to the longitudinal axis (i.e., axis 112 shown in FIG. 2B) of a pipette tip and at the center point of the longitudinal panel or groove length. A width sometimes is expressed as a linear distance at a proximal region exterior surface (e.g., 122 as shown in FIG. 4A) from one side of a groove or panel to the other side. A width sometimes is expressed as a circumferential distance measured from one side of the groove or panel to the other side along a virtual circumference that contacts the panel faces. A circumferential distance sometimes is expressed in degrees (i.e., a portion of 360 degrees) and can be expressed in radians.

A groove width X is a linear or circumferential distance typically measured at a proximal region exterior surface between two panels flanking a groove (e.g., width $X^1$ shown in FIG. 4B). In some embodiments, all of the grooves of a pipette tip have the same width.

In certain embodiments, one or more of the grooves of a pipette tip have different widths (e.g., 2, 3, 4, 5, 6, 7, 8, 9, 10 or more different widths for grooves). One or more grooves of a pipette tip sometimes have a groove width (linear distance) of about 0.003 inches to about 0.040 inches, about 0.003 inches to about 0.030 inches about 0.003 inches to about 0.025 inches, about 0.005 inches to about 0.02 inches, about 0.01 inches to about 0.015 inches (e.g., about 0.003 inches, about 0.004 inches, about 0.005 inches, about 0.006 inches, about 0.007 inches, about 0.008 inches, about 0.009 inches, about 0.010 inches, about 0.011 inches, about 0.012 inches, about 0.013 inches, about 0.014 inches, about 0.015 inches, about 0.016, inches, about 0.017 inches, about 0.018 inches, about 0.019 inches, about 0.020 inches, about 0.021 inches, about 0.022 inches, about 0.023 inches, about 0.024 inches, about 0.025 inches, about 0.026 inches, about 0.027 inches, about 0.028 inches, about 0.029 inches, about 0.030 inches, about 0.031 inches, about 0.032 inches, about 0.033 inches, about 0.034 inches, about 0.035 inches, about 0.036 inches, about 0.037 inches, about 0.038 inches, about 0.039 inches or about 0.040). In some embodiments, one or more grooves of a pipette tip have a groove width (circumferential distance) of about 5 degrees to about 30 degrees (e.g., about 1 degree, about 2 degrees, about 3 degrees, about 4 degrees, about 5 degrees, about 6 degrees, about 7 degrees, about 8 degrees, about 9 degrees, about 10 degrees, about 11 degrees, about 12 degrees, about 13 degrees, about 14 degrees, about 15 degrees, about 16 degrees, about 17 degrees, about 18 degrees, about 19 degrees, about 20 degrees, about 21 degrees, about 22 degrees, about 23 degrees, about 24 degrees, about 25 degrees, about 26 degrees, about 27 degrees, about 28 degrees, about 29 degrees or about 30 degrees).

A panel width Y is a linear or circumferential distance typically measured at a proximal region exterior surface from one end of a panel face to the other end of the panel face Y (e.g., width $Y^1$ shown in FIG. 4B). In some embodiments, all of the panels of a pipette tip have the same width. In certain embodiments, one or more of the panels of a pipette tip have different widths (e.g., 2, 3, 4, 5, 6, 7, 8, 9, 10 or more different widths for panels). In some embodiments, one or more panels have a panel width (linear distance) of about 0.025 inches to about 0.175 inches, about 0.050 inches to about 0.150 inches, about 0.075 inches to about 0.10 inches (e.g., about 0.025 inches, about 0.026 inches, about 0.027 inches, about 0.028 inches, about 0.029 inches, about 0.030 inches, about 0.031 inches, about 0.032 inches, about 0.033 inches, about 0.034 inches, about 0.035 inches, about 0.036 inches, about 0.037 inches, about 0.038 inches, about 0.039 inches, about 0.040 inches, about 0.041 inches, about 0.042 inches, about 0.043 inches, about 0.044 inches, about 0.045 inches, about 0.046 inches, about 0.047 inches, about 0.048 inches, about 0.049 inches, about 0.050 inches, about 0.051 inches, about 0.052 inches, about 0.053 inches, about 0.054 inches, about 0.055 inches, about 0.056 inches, about 0.057 inches, about 0.058 inches, about 0.059 inches, about 0.060 inches, about 0.061 inches, about 0.062 inches, about 0.063 inches, about 0.064 inches, about 0.065 inches, about 0.066 inches, about 0.067 inches, about 0.068 inches, about 0.069 inches, about 0.070 inches, about 0.071 inches, about 0.072 inches, about 0.073 inches, about 0.074 inches, about 0.075 inches, about 0.076 inches, about 0.077 inches, about 0.078 inches, about 0.079 inches, about 0.080 inches, about 0.081 inches, about 0.082 inches, about 0.083 inches, about 0.084 inches, about 0.085 inches, about 0.086 inches, about 0.087 inches, about 0.088 inches, about 0.089 inches, about 0.090 inches, about 0.091 inches, about 0.092 inches, about 0.093 inches, about 0.094 inches, about 0.095 inches, about 0.096 inches, about 0.097 inches, about 0.098 inches, about 0.099 inches, about 0.100 inches, about 0.101 inches, about 0.102 inches, about 0.103 inches, about 0.104 inches, about 0.105 inches, about 0.106 inches, about 0.107 inches, about 0.108 inches, about 0.109 inches, about 0.110 inches, about 0.111 inches, about 0.112 inches, about 0.113 inches, about 0.114 inches, about 0.115 inches, about 0.116 inches, about 0.117 inches, about 0.118 inches, about 0.119 inches, about 0.120 inches, about 0.121 inches, about 0.122 inches, about 0.123 inches, about 0.124 inches, about 0.125 inches, about 0.126 inches, about 0.127 inches, about 0.128 inches, about 0.129 inches, about 0.130 inches, about 0.131 inches, about 0.132 inches, about 0.133 inches, about 0.134 inches, about 0.135 inches, about 0.136 inches, about 0.137 inches, about 0.138 inches, about 0.139 inches, about 0.140 inches, about 0.141 inches, about 0.142 inches, about 0.143 inches, about 0.144 inches, about 0.145 inches, about 0.146 inches, about 0.147 inches, about 0.148 inches, about 0.149 inches, about 0.150 inches, about 0.151 inches, about 0.152 inches, about 0.153 inches, about 0.154 inches, about 0.155 inches, about 0.156 inches, about 0.157 inches, about 0.158 inches, about 0.159 inches, about 0.160 inches about 0.161 inches, about 0.162 inches, about 0.163 inches, about 0.164 inches, about 0.165 inches, about 0.166 inches, about 0.167 inches, about 0.168 inches, about 0.169 inches, about 0.170 inches, about 0.171 inches, about 0.172 inches, about 0.173 inches, about 0.174 inches or about 0.175 inches). In some embodiments, one or more panels of a pipette tip have a panel width (circumferential distance) of about 10 degrees to about 175 degrees, about 20 degrees to about 165 degrees, about 30 degrees to about 155 degrees, about 40 degrees to about 145 degrees, about 50 degrees to about 135 degrees, about 60 degrees to about 125 degrees, about 70 degrees to about 115 degrees, about 80 degrees to about 105 degrees, about 90 degrees to about 100 degrees (e.g. about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, about 90 degrees, about 95 degrees, about 100 degrees, about 105 degrees, about 110 degrees, about 115 degrees, about 120 degrees, about 125 degrees, about 130 degrees, about 135 degrees, about 140 degrees, about 145 degrees, about 150 degrees, about 155 degrees, about 160 degrees, about 165 degrees, about 170 degrees or about 175 degrees) and values in between.

In some embodiments, a panel width Y of a pipette tip is greater than a groove width X of a pipette tip. In certain embodiments, a panel width for each panel of a pipette tip is greater than a groove width for each groove of a pipette tip. In some embodiments, a panel width is more than about 2 times greater than a groove width, more than about 5 times greater than a groove width, more than about 10 times greater than a groove width; more than about 20 times greater than a groove width; more than about 25 times greater than a groove width. In some embodiments, a panel width is about 1.1 to about 50 times greater than a groove width (e.g., about 1.1 times greater, about 1.1 times greater, about 1.2 times greater, about 1.3 times greater, about 1.4 times greater, about 1.5 times greater, about 1.6 times greater, about 1.7 times greater, about 1.8 times greater, about 1.9 times greater, about 2 times greater; about 3 times greater; about 4 times greater; about 5 times greater; about 6 times greater; about 7 times greater; about 8 times greater; about 9 times greater; about 10 times greater; about 11 times greater; about 12 times greater; about 13 times greater; about 14 times greater; about 15 times greater; about 16 times greater; about 17 times greater; about 18 times greater; about 19 times greater; about 20 times greater; about 21 times greater; about 22 times greater; about 23 times greater; about 24 times greater; about 25 times greater; about 26 times greater; about 27 times greater; about 28 times greater; about 29 times greater; about 30 times greater; about 31 times greater; about 32 times greater; about 33 times greater; about 34 times greater; about 35 times greater; about 36 times greater; about 37 times greater; about 38 times greater; about 39 times greater; about 40 times greater; about 41 times greater; about 42 times greater; about 43 times greater; about 44 times greater; about 45 times greater; about 46 times greater; about 47 times greater; about 48 times greater; about 49 times greater or about 50 times greater).

The sum of all groove widths and panel widths of a pipette tip equal the circumference of a pipette tip measured around the exterior surface of the pipette tip. The circumference of a pipette tip in the proximal region generally will increase as the fluid capacity of the tip increases (e.g., 10 ul, 200 ul, 300 ul, 1000 ul, 1250 ul). In some embodiments this relationship is described by the following equation:

$$C=nX+nY$$

C is a circumference value measured at the panel faces

X is the groove width

Y is the panel width n is the number of panels or grooves (Assumption is that groove widths are equal and panel widths are equal).

Utilizing the above-described relationship, for pipette tips of any circumference, values for X, Y and n can be determined that in conjunction with suitable values as described for W and Z provide for enhanced wall expandability while maintaining wall stability.

Without being limited by theory, as groove widths are smaller than panel widths, grooves represent a smaller percentage of a pipette tip external surface than panels. Panels principally provide the structural integrity of a pipette tip wall, allowing the thickness of a pipette tip wall at the groove floor (distance between a groove floor and an interior surface of a pipette tip opposite the groove floor) to be minimized. Axial forces generated when a fluid dispensing device member (e.g., barrel, nozzle or mounting shaft) is inserted into the interior of a pipette tip are focused to the thin wall regions under grooves, as these represent the weakest portions of a pipette tip wall. Accordingly less force is required to stretch (expand) a pipette tip wall to accommodate and seal a mounting shaft or nozzle as these regions not only are structurally favorable to expansion and hoop stretching (thin walls), but also represent a small portion of the overall pipette tip wall surface. An insertion force required to cause hoop stretching (expansion) for a pipette tip having grooves and panels with the described dimensions is substantially less than the insertion force required to cause hoop stretching (expansion) for a pipette tip not having these features. Also without being limited by theory, a disengagement force (ejection force) required to disassociate a pipette tip having the described features is substantially less than the disengagement force required to disassociate a pipette tip not having the described features. Reduced insertion and disengagement forces can reduce strain on a user associated with attaching and ejecting pipette tips, and can reduce the occurrence and severity of repetitive motion conditions, for example.

A latitudinal profile is a profile across a latitudinal axis or cutting plane of a pipette tip, which latitudinal distance or cutting plane is perpendicular to a longitudinal axis (e.g., axis 112 as shown in FIG. 2B). In some embodiments, a latitudinal profile of one or more or all panels is stepped or curved. In some embodiments, a latitudinal profile of one or more or all panel faces is linear (flat) or curved. Sometimes a latitudinal profile of one or more or all panel sidewalls of a pipette tip is stepped at about 90 degrees relative to the linear width of a panel face, sometimes is angled at a non-90 degree angle relative to the linear width of a panel face (beveled) (e.g., an angle of about 30 degrees to about 89 degrees; about 35 degrees to about 85 degrees; about 40, 45, 50, 55, 60, 65, 70, 75, 80 degrees) and sometimes is curved. A latitudinal profile of one or more or all grooves sometimes is stepped, V-shaped or U-shaped (curved). A latitudinal profile of one or more or all groove floors sometimes is linear (flat), a point or substantially a point or curved.

One or more or all panel faces in some embodiments include a protrusion (e.g., 462 as shown in FIG. 17). A protrusion sometimes has a protrusion width V that extends along part, the majority of, or all of the longitudinal length of a panel (e.g., $V^4$ as shown in FIG. 17). In certain embodiments, the protrusion width for one or more of the protrusions is a linear width of about 0.010 inches to about 0.10 inches (e.g., about 0.010 inches, about 0.011 inches, about 0.012 inches, about 0.013 inches, about 0.014 inches, about 0.015 inches, about 0.016 inches, about 0.017 inches, about 0.018 inches, about 0.019 inches, about 0.020 inches, about 0.021 inches, about 0.022 inches, about 0.023 inches, about 0.024 inches, about 0.025 inches, about 0.026 inches, about 0.027 inches, about 0.028 inches, about 0.029 inches, about 0.030 inches, about 0.031 inches, about 0.032 inches, about 0.033 inches, about 0.034 inches, about 0.035 inches, about 0.036 inches, about 0.037 inches, about 0.038 inches, about 0.039 inches, about 0.040 inches, about 0.041 inches, about 0.042 inches, about 0.043 inches, about 0.044 inches, about 0.045 inches, about 0.046 inches, about 0.047 inches, about 0.048 inches, about 0.049 inches, about 0.050 inches, about 0.051 inches, about 0.052 inches, about 0.053 inches, about 0.054 inches, about 0.055 inches, about 0.056 inches, about 0.057 inches, about 0.058 inches, about 0.059 inches, about 0.060 inches, about 0.061 inches, about 0.062 inches, about 0.063 inches, about 0.064 inches, about 0.065 inches, about 0.066 inches, about 0.067 inches, about 0.068 inches, about 0.069 inches, about 0.070 inches, about 0.071 inches, about 0.072 inches, about 0.073 inches, about 0.074 inches, about 0.075 inches, about 0.076 inches, about 0.077 inches, about 0.078 inches, about 0.079 inches, about 0.080 inches, about 0.081 inches, about 0.082 inches, about 0.083 inches, about 0.084 inches, about 0.085 inches, about 0.086 inches, about 0.087 inches, about 0.088 inches, about 0.089 inches, about 0.090 inches, about 0.091 inches, about 0.092 inches, about 0.093 inches, about 0.094 inches, about 0.095 inches, about 0.096 inches, about 0.097 inches, about 0.098 inches, about 0.099 inches or about 0.10 inches). In certain embodiments, the protrusion width for one or more of the protrusions is a circumferential width of about 5 degrees to about 160 degrees, about 10 degrees to about 150 degrees, about 20 degrees to about 140 degrees, about 30 degrees to about 130 degrees, about 40 degrees to about 120 degrees, about 50 degrees to about 110 degrees, about 60 degrees to about 100 degrees, about 70 degrees to about 90 degrees, about 80 degrees to about 90 degrees (e.g., about, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159 or 160 degrees).

A protrusion often includes a protrusion face (e.g., 470 as shown in FIG. 17) and a distance T between a panel face and a protrusion face, protrusion thickness, (e.g., $T^4$ as shown in FIG. 17). A protrusion thickness can be about 0.005 inches to about 0.050 inches; about 0.010 inches to about 0.040 inches; about 0.010 inches to about 0.030 inches, about 0.010 inches to about 0.020 inches; (e.g., about 0.005 inches, about 0.006 inches, about 0.007 inches, about 0.008 inches, about 0.009 inches, about 0.010 inches, about 0.011 inches, about 0.012 inches, about 0.013 inches, about 0.014 inches, about 0.015 inches, about 0.016 inches, about 0.017 inches, about 0.018 inches, about 0.019 inches, about 0.020 inches, about 0.021 inches, about 0.022 inches, about 0.023 inches, about 0.024 inches, about 0.025 inches, about 0.026 inches, about 0.027 inches, about 0.028 inches, about 0.029 inches, about 0.030 inches, about 0.031 inches, about 0.032 inches, about 0.033 inches, about 0.034 inches, about 0.035 inches, about 0.036 inches, about 0.037 inches, about 0.038 inches, about 0.039 inches, about 0.040 inches, about 0.041 inches, about 0.042 inches, about 0.043 inches, about 0.044 inches, about 0.045 inches, about 0.046 inches, about 0.047 inches, about 0.048 inches, about 0.049 inches or about 0.050 inches). A panel face that includes a protrusion often has a transition surface between the panel face and the protrusion face (e.g., 465 as shown in FIG. 17). The latitudinal profile of one or more or all protrusions sometimes is stepped or curved. The latitudinal profile of one or more or all protrusion faces sometimes is flat (linear) or curved, and the latitudinal profile of one or more or all panel transition surfaces sometimes is stepped, beveled or curved. One or more or all panel faces in some embodiments do not include a protrusion. Without being limited by theory, a protrusion may contribute to the overall stability of a pipette tip wall.

In some embodiments, the proximal regions of a pipette tip having grooves and panels as described herein is capable of hoop stretching at a sealing zone upon insertion of a fluid dispensing device member into the interior of the pipette tip. In some embodiments, the hoop stretching (expansion) is about 0.001 inches to about 0.005 inches; about 0.002 inches to about 0.004 inches; e.g., about 0.001 inches; about 0.002 inches; about 0.003 inches; about 0.004 inches; about 0.005 inches.

In some embodiments, the interior surface of the pipette tip in the proximal region is in contact with the exterior surface of a fluid dispensing device member and forms a seal between the fluid dispensing device member and the interior surface of the pipette tip in pipette tip at the sealing zone, and the proximal region of the pipette tip is in an expanded state relative to a relaxed state adopted by the proximal region of the pipette tip when the interior surface of the pipette tip is not in contact with the fluid dispensing device member and forming a seal with the fluid dispensing device member.

Non-limiting examples of expansion pipette tips having panels and grooves are illustrated in FIG. 1 to FIG. 26. For example, FIG. 1 to FIG. 6 show a pipette tip embodiment 100 having a proximal region 130 and a distal region 135 with a junction 115 between the proximal region and the distal region. The proximal region has a proximal terminus 105 and a distal terminus, shoulder 116. The distal region has a proximal terminus at junction 115 and a distal terminus 125. A pipette tip includes an interior region 185 with a proximal region interior surface 180 and a distal region interior surface 190 and an exterior region having a proximal region exterior surface 122 (FIG. 4A) and a distal region exterior surface 120. A pipette tip includes an annular flange 110. FIG. 2B shows a pipette tip relative to a longitudinal axis; longitudinal orientation 112 and a circumference; latitudinal orientation 113.

The proximal region exterior surface includes a plurality of longitudinally-disposed grooves 140 and panels 170 as shown in FIG. 1. Groove 140 includes a groove floor 150 (as shown in FIG. 4B) as a point or substantially a point), a groove width $X^1$ (as shown in FIG. 4B) and a distance $Z^1$ between a groove floor and the interior surface of the pipette tip opposite the groove floor (wall thickness) (as shown in FIG. 4B). Groove 140 as shown in FIG. 4B presents a V-shaped latitudinal profile. Panel 170 includes a panel face 160, a panel sidewall 145, a panel width $Y^1$ and a distance $W^1$ between a panel face and the interior surface of the pipette tip opposite the panel face (wall thickness) as shown in FIG. 4B. Panel face 160 has a flat (linear) latitudinal profile. Panel sidewall 145 has a beveled (angled) latitudinal profile.

FIG. 1 to FIG. 6 show pipette tip embodiment 100 having a particular groove and panel geometry. Other groove and panel geometries and configurations (e.g., numbers of grooves and panels, groove and panel profiles, groove and panel widths (X and Y) and pipette tip wall thicknesses (Z and W)) can facilitate hoop expansion of the pipette tip sealing region when a dispensing device member is inserted in the interior of a pipette tip. Non-limiting examples of alternative groove and panel geometries are illustrated for pipette tip embodiment 200 shown in FIG. 7 to FIG. 10 and pipette tip embodiment 300 shown in FIG. 11 to FIG. 14. Shown in FIG. 9 for embodiment 200, groove 240 has a stepped latitudinal profile with a flat (linear) groove floor 250. Panel face 260 has a flat or linear latitudinal profile and panel sidewall 245 has a stepped latitudinal profile. The groove width is denoted $X^2$ and the panel width is denoted $Y^2$. The distance between a groove floor and the interior surface of the pipette tip opposite the groove floor (wall thickness) is $Z^2$. The distance between a panel face and the interior surface of the pipette tip opposite the panel face (wall thickness) is designated $W^2$. Shown in FIG. 13 for embodiment 300, groove 340 has a curved (u-shaped) latitudinal profile with a curved groove floor 350. Panel face 360 has a flat or linear latitudinal profile and panel sidewall 345 has a curved latitudinal profile. The groove width is denoted $X^3$ and the panel width is denoted $Y^3$. The distance between a groove floor and the interior surface of the pipette tip opposite the groove floor (wall thickness) is denoted $Z^3$. The distance between a panel face and an interior surface of a pipette tip opposite the panel face (thickness) is denoted $W^3$.

FIG. 15 to FIG. 18 show pipette tip embodiment 400 having a particular geometry of a groove and panel with a protrusion. Shown in FIG. 17 for embodiment 400, groove 440 latitudinal profile is stepped and groove floor 450 is linear or flat. Panel face 455 has a flat or linear latitudinal profile and panel sidewall 445 latitudinal profile is shown as stepped. The groove width is denoted $X^4$ and the panel width is denoted $Y^4$. The distance between a groove floor and the interior surface of the pipette tip opposite the groove floor (wall thickness) is designated $Z^4$. The distance between a panel face and an interior surface of a pipette tip opposite the panel face (thickness) is designated $S^4$. Protrusion 462 has a protrusion face 470 having a flat or linear profile and a transition surface 465 that is stepped. Protrusion width is denoted $V^4$ and the distance between a panel face and a protrusion face is denoted $T^4$. The distance between protrusion 470 face and the interior surface of a pipette tip opposite the panel face with the protrusion is denoted $W^4$.

Non-limiting examples of alternative geometries of grooves and panels with a protrusion are illustrated for pipette tip embodiment 500 shown in FIG. 19 to FIG. 22 and pipette tip embodiment 600 in FIG. 23 to FIG. 26. Shown in FIG. 21 for embodiment 500, groove 540 has a curved latitudinal profile with a curved groove floor 550. Panel face 555 has a flat or linear latitudinal profile and panel sidewall 545 has curved latitudinal profile. The groove width is denoted $X^5$ and the panel width is denoted $Y^5$. The distance between a groove floor and the interior surface of the pipette tip opposite the groove floor is shown as $Z^5$. The distance between a panel face and an interior surface of a pipette tip opposite the panel face (thickness) is designated $S^5$. Protrusion 562 has a protrusion face 570 having a latitudinal profile that is flat or linear and a transition surface 565 latitudinal profile that is a stepped. Protrusion width is denoted $V^5$ and the distance between a panel face and a protrusion face is shown as $T^5$. The distance between a protrusion face 570 and an interior surface of a pipette tip opposite the panel face is denoted by $W^5$. Shown in FIG. 25 for embodiment 600, groove 640 latitudinal profile is v-shaped with a groove floor 650 that is a point or substantially a point. Panel face 655 latitudinal profile is flat or linear and panel sidewall 645 latitudinal profile is beveled. The groove width is labelled $X^6$ and the panel width is labelled $Y^6$. The distance between a groove floor and the interior surface of the pipette tip opposite the groove floor is denoted $Z^6$. Distance between a panel face and an interior surface of a pipette tip opposite the panel face (thickness) is denoted $S^6$. Protrusion 662 has a protrusion face 670 having a latitudinal profile that is curved and a transition surface 665 latitudinal profile that is curved. Protrusion width is denoted $V^6$ and the distance between a panel face and a protrusion face is denoted by $T^6$. The distance between protrusion face 670 and an interior surface of a pipette tip opposite the panel face with the protrusion is denoted by $W^6$.

Compression Sealing Tips

In some embodiments, features generally as described for expansion sealing pipette tips (including, but not limited to, grooves, groove widths, groove profiles, pipette tip wall thickness under a groove, panels, panel faces, panel sidewalls, panel profiles, thickness of a pipette tip wall at a panel and protrusions) are present in compression sealing tips. A principle difference expansion and compression sealing tips is the position of the grooves and panels relative to the interior and exterior surfaces of a pipette tip. For an expansion sealing tip an interior surface of a proximal region of a pipette tip is substantially smooth and uniform; for a compression sealing tip an exterior surface of a proximal region of a pipette tip is substantially smooth and uniform. Grooves and panels are located on an exterior surface of a proximal region of a pipette tip for an expansion sealing tip. Grooves and panels are located on an interior surface of a proximal region of a pipette tip for a compression sealing tip. A sealing zone is an interior surface of the proximal region of an expansion sealing tip. In distinction, a sealing zone (e.g., 736 as shown in FIG. 27E) for a compression sealing tip is an exterior surface of a proximal region. In some embodiments, a compression sealing tip has a blade feature at the distal region of the pipette tip. In some embodiments, a compression sealing tip has one or more or all panel faces includes a protrusion. Compression sealing tips do not typically include an annular flange.

Grooves and panels that facilitate wall expansion for expansion sealing pipette tips, when present in compression sealing pipette tips facilitate compression of a pipette tip wall when the compression sealing pipette tip is attached to a suitable fluid dispensing device member. Without being limited by theory, axial forces generated when a fluid dispensing device member (e.g., barrel, nozzle or mounting shaft) is inserted around the exterior surface of a compression sealing pipette tip are focused to the thin wall regions under grooves, as these represent the weakest portions of a pipette tip wall. Accordingly less force is required to compress a pipette tip wall to accommodate and seal a mounting shaft or nozzle as these regions (thin walls) are not only structurally favorable to compression, but also represent a small portion of the overall pipette tip wall surface. An insertion force required to cause compression of a pipette tip wall of a pipette tip having grooves and panels with the described characteristics and dimensions is substantially less than the insertion force required to cause compression of the wall of a pipette tip not having these features. Also without being limited by theory, a disengagement force required to disassociate a pipette tip having the described features is substantially less than the disengagement force required to disassociate a pipette tip not having the described features. Reduced insertion and disengagement forces can reduce strain on a user associated with attaching and ejecting pipette tips, and can reduce the occurrence and severity of repetitive motion conditions, for example.

Non-limiting examples of compression sealing pipette tips with panels and grooves are illustrated in FIG. 27A to FIG. 38. For example, FIG. 27A to FIG. 30 show a pipette tip embodiment 700 having a proximal region 730 and a distal region 735 with a junction 715 between the proximal region and the distal region (see FIG. 27E). The proximal region has a proximal terminus 705 and a distal terminus, shoulder 716. The distal region has a proximal terminus at junction 715 and a distal terminus 725. A pipette tip includes a proximal region interior region 785 with a proximal region interior surface 722 and a proximal region exterior surface 780 (shown in FIG. 28B). The proximal region is substantially cylindrical and the exterior surface of the proximal region is substantially smooth and uniform. The proximal region exterior surface 780 includes a sealing zone 736 which contacts an interior surface of a fluid dispensing member when a pipette tip is inserted into the fluid dispensing member. The pipette tip includes a distal region having a distal region interior surface 790 and a distal region exterior surface 720 (shown in FIG. 30).

The proximal region interior surface includes a plurality of longitudinally-disposed grooves 740 and panels 765 (shown in FIG. 27C). Shown in FIG. 28B, groove 740 includes groove floor 750, groove width $X^7$ and distance $Z^7$ between the groove floor and the exterior surface of the pipette tip opposite the groove floor (thickness). Groove 740 shows a latitudinal profile that is V-shaped. Groove floor 750 is shown with a latitudinal profile that is a point or substantially a point. Panel 765 includes a panel face 760, panel sidewall 745, panel width $Y^7$ and a distance $W^7$ between the panel face and the exterior surface of the pipette tip opposite the panel face (thickness). Panel face 760 has a latitudinal profile is flat or linear and panel sidewall 745 latitudinal profile is beveled (angled).

FIG. 27A to FIG. 30 show pipette tip embodiment 700 having a particular groove and panel geometry. Other groove and panel geometries and configurations (e.g., numbers of grooves and panels, groove and panel profiles, groove and panel widths (X and Y) and pipette tip wall thicknesses (Z and W)) can facilitate compression of the pipette tip sealing region when a dispensing device member is inserted around the exterior of a pipette tip. Non-limiting examples of alternative groove and panel geometries are illustrated for compression sealing pipette tip embodiment 800 shown in FIG. 31 to FIG. 34 and compression sealing pipette tip embodiment 900 shown in FIG. 35 to FIG. 38. Shown in FIG. 33 for embodiment 800, groove 840 includes groove floor 850, groove width denoted $X^8$ and distance between the groove floor and the exterior surface of the pipette tip opposite the groove floor (thickness) denoted $Z^8$. Groove 840 has a latitudinal profile that is stepped and a flat groove floor 850. Panel 865 includes panel face 860, panel sidewall 845, panel width $Y^8$ and a distance between the panel face and the exterior surface of the pipette tip opposite the panel face (thickness) denoted as $W^8$. Panel face 860 has latitudinal profile that is flat or linear and panel sidewall 845 latitudinal profile is beveled. Shown in FIG. 37 for embodiment 900, groove 940 include groove floor 950, groove width $X^9$ and distance between the groove floor and the exterior surface of the pipette tip opposite the groove floor (thickness) denoted as $Z^9$. Groove 940 has a latitudinal profile that is u-shaped and a groove floor 950 that is curved. Panel 965 includes panel face 960, panel sidewall 945, panel width $Y^9$ and a distance between the panel face and the exterior surface of the pipette tip opposite the panel face (thickness) is denoted $W^9$. Panel face 960 has a latitudinal profile that is linear or flat and panel sidewall 945 latitudinal profile that is curved.

Additional Pipette Tip Embodiments

Pipette tip embodiments described above can include one or more of the following features.

Blade Feature

Some pipette tip embodiments can include a distal region having a tapered wall thickness and terminating with a "knife edge" thickness. The term "knife edge" or "blade," as used herein refers to an edge resulting from a continuous taper of a pipette wall surface. The taper can be established by the inner surface disposed at a different angle than the outer surface along all or a portion of the axial length of the distal region. In certain embodiments, the surfaces form a sharply defined single contiguous edge or boundary of minimal thickness. Without being limited by theory, a knife edge or blade feature (e.g., distal region terminus wall thickness 1030 shown in FIG. 39B) may reduce the area of the surface to which liquid droplets can adhere, and also may reduce the surface tension between the tip and the droplets, thereby reducing the probability and frequency with which droplets may adhere to the discharge aperture of the pipette tips. Without being limited by theory, the "inverse taper" (e.g., the taper of the inner surface caused by the thinning of the distal terminus, while the outer surface taper remains constant) of the blade feature may cause drops of liquid to become less likely to adhere to the pipette tip while being dispelled from the pipette tip due to the combination of increased drop surface area and surface tension (e.g., the drop is stretched due to the internal inverse taper) and decreased pipette tip inner surface area, in some embodiments. Without being limited by theory, the combination of increased drop surface area and surface tension combined with the decreased pipette tip surface area enables the efficient release of liquid droplets from the surfaces of the pipette tip. This feature also may reduce the number of times a user needs to touch a pipette tip to a surface to remove a droplet adhered to the pipette tip, which sometimes is referred to as "touching off." Reducing the number of times a user needs to touch off may help increase throughput of samples (e.g., time savings), increase accuracy of sample delivery (e.g., delivery of entire sample or reagent), and decrease costs (e.g., fewer repetitive injury claims, higher sample throughput, and fewer repeated samples due to pipetting error or inaccuracy). This feature also may increase precision and accuracy in manual or automated applications.

In some embodiments, the lower (or distal) about one-quarter of the distance from the distal region terminus (e.g., 125 shown in FIG. 2B) to the junction (e.g., 115 shown in FIG. 1), may comprise a "blade" or "knife edge" feature. In certain embodiments shown in FIGS. 39A and 39B, a distal region of a pipette tip 1000 featuring a knife or blade edge has a wall thickness 1030 in the range of about 0.0030 inches to about 0.0055 inches thick. In some embodiments, shown in FIG. 39A and FIG. 39B, the wall thickness 1030 at distal terminus 1010 can resemble a blade or knife edge and can be about 0.0030 inches, about 0.0031 inches, about 0.0032 inches, about 0.0033 inches, about 0.0034 inches, about 0.0035 inches, about 0.0036 inches, about 0.0037 inches, about 0.0038 inches, about 0.0039 inches, about 0.0040 inches, 0.0041 inches, 0.0042 inches, 0.0043 inches, 0.0044 inches, 0.0045 inches, 0.0046 inches, 0.0047 inches, 0.0048 inches, 0.0049 inches, 0.0050 inches, 0.0051 inches, 0.0052 inches, 0.0053 inches, 0.0054 inches, or about 0.0055 inches thick. In some embodiments, the wall thickness at the distal region terminus is about 0.0043 inches to about 0.0050 inches. In certain embodiments, the wall thickness at the distal region terminus is about 0.0044 inches to about 0.0049 inches. In certain embodiments, the distal region comprises a wall thickness that tapers from (a) a point at or between (i) about the junction of the proximal region (e.g., 115) and distal region (e.g., 125) to (ii) about one quarter of the axial distance from the terminus of the distal region to the junction, to (b) the distal region terminus (e.g., 1010), as illustrated in FIG. 39B.

Figure 39A:
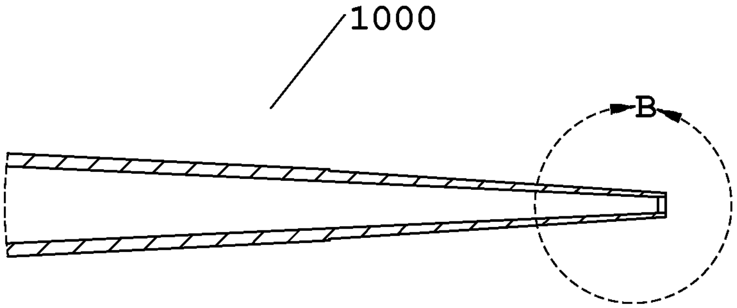
FIG. 39A shows a distal region of a pipette tip.
Figure 39B:
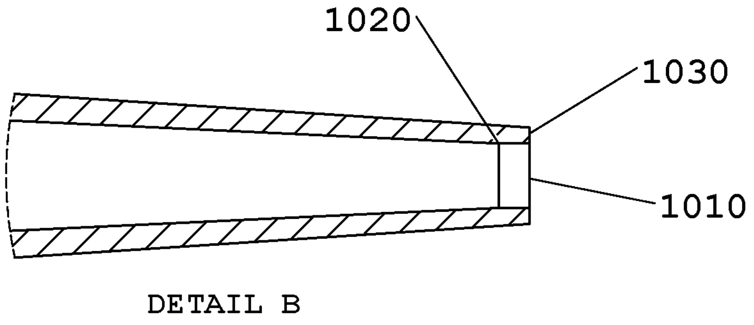
FIG. 39B is an enlarged view of the distal aperture, illustrating the decrease in taper ending in the "blade" or "knife-edge" tip.

FIG. 39B is an enlarged view of the detail area highlighted in FIG. 39A. Illustrated in FIG. 39B is a gradually decreasing taper. The decreasing taper is denoted by the change in taper from about 4.2 degrees to about 2.7 degrees. The decrease in taper continues until the taper angle reaches 0 at or near region 1020, in the range of about 0.008 to about 0.012 inches from distal region terminus 1010. In some embodiments, the region of 0 degree taper 1020 (e.g., the region where the inner and outer walls become essentially parallel, for example) can be about 0.008 inches, about 0.009 inches, about 0.010 inches, about 0.011 inches or about 0.012 inches from distal region terminus 1010. This region, starting approximately about 0.008 to about 0.012 inches from distal terminus 1010 and ending at distal terminus 1010, defines the knife edge or blade region of a pipette tip. The region where the taper ends is highlighted as a line 1020 denoting the point where the inner and outer walls become essentially parallel (e.g., taper angle becomes 0 degrees). The distal terminus region wall thickness 1030 in this area is described above, and in the embodiment illustrated in FIG. 39B is about 0.0044 inches thick.

In some embodiments, a pipette tip having a wall thickness at the distal region terminus as described above is configured to retain less than 0.065% of the fluid drawn into the pipette tip, after the fluid is dispensed (e.g., less than about 0.065%, 0.060%, 0.055%, 0.050%, 0.045%, 0.040%, 0.035%, 0.030%, 0.025%, 0.020%, 0.015%, 0.010%, 0.0095%, 0.0090%, 0.0085%, 0.0080%, 0.0075%, 0.0070%, 0.0065%, 0.0060%, 0.0055%, 0.0050%, 0.0045%, 0.0040%, 0.0035%, 0.0030%, 0.0025%, 0.0020%, 0.0015%, 0.0010%, 0.00095%, 0.00090%, 0.00085%, 0.00080%, 0.00075%, 0.00070%, 0.00065%, 0.00060%, 0.00055%, 0.00050%, 0.00045%, 0.00040%, 0.00035%, 0.00030%, 0.00025%, 0.00020%, 0.00015%, 0.00014%, 0.00013%, 0.00012%, 0.00011%, or about 0.00010%). In certain embodiments, the pipette tip retains between about 0.00010% and about 0.00015% (e.g., about 0.00011%, 0.00012%, 0.00013%, or 0.00014%) of the fluid drawn into the tip, after the fluid is dispensed. In some embodiments, the pipette tip is configured to retain no more than 0.00012% of the fluid drawn into the tip, after the fluid is dispensed.

Annular Groove

In certain embodiments, the interior region of the proximal region of a pipette tip comprises an optional annular groove. As described above, annular groove is an area of increased surface area formed during the molding process that corresponds to a portion of the mold core pin. The core pin often forms the internal surfaces of the object to be molded, for example the pipette tips described herein. The distance between the core pin and the mold cavity (e.g., the part of the mold that forms the outer surface of the object) determines the thickness of the object to be molded (e.g., pipette tip). The shape of the core pin can offer an increased surface area upon which the cooling pipette tip (e.g., specifically annular groove may find purchase and therefore remain in contact with the core pin during cooling and separation from the portion of the mold that forms the pipette tip outer surface, which in turn may facilitate release and ejection of the pipette tip from the mold core after cooling of the pipette tip. Annular groove resides on the interior surface of proximal region (e.g., 180 shown in FIG. 4B). The sealing zone, which is located in the proximal region of a pipette tip, sometimes is located at a position in the pipette tip interior proximal of the annular groove, sometimes is located at a position distal to annular groove, and sometimes is located in the same region as annular groove.

Methods of Use

Pipette tips frequently are used in conjunction with a pipetting device (manual or automated) to take up, transport or deliver precise volumes of liquids or reagents.

Provided herein is a method for engaging an expansion sealing pipette tip with a fluid dispensing device member comprising inserting a fluid dispensing device member into a pipette tip of any one of the described embodiments with a force sufficient to form a seal between the fluid dispensing device member and the pipette tip at a sealing zone. In certain embodiments, a proximal region of the pipette tip hoop stretches at a sealing zone. In certain embodiments the amount of hoop stretching is about 0.001 inches to about 0.005 inches.

Provided herein is a method for engaging a compression sealing pipette tip with a fluid dispensing device member comprising contacting a fluid dispensing device member with an exterior surface of a pipette tip of any one of the described embodiments with a force sufficient to form a seal between the fluid dispensing device member and the pipette tip at a sealing zone. In certain embodiments, a proximal region of a pipette tip is compressed at a sealing zone. In certain embodiments the amount of compression is about 0.001 inches to about 0.005 inches.

Provided herein is a method of using a pipette tip comprising (a) contacting a pipettor with a pipette tip and forming a seal between the pipettor and the pipette tip, and (b) contacting the pipette tip with a fluid, where the pipette tip comprises a proximal region and a distal region, and further where the proximal region comprises axially oriented grooves and panels.

Pipette tip embodiments described herein can be of any overall geometry useful for dispensing fluids in combination with a fluid dispensing device. The pipette tips described herein also can be of any volume useful for dispensing fluids in combination with a fluid dispensing device. Non-limiting examples of volumes useful for dispensing fluids in combination with a fluid dispensing device, and described as non-limiting embodiments herein, include pipette tips configured in sizes that hold from 0 to 10 microliters, 0 to 20 microliters, 1 to 100 microliters, 1 to 200 microliters, 1 to 300 microliters, and from 1 to 1250 microliters, for example. In some embodiments, the volumes pipette tips described herein can manipulate are larger than the volume designation given that particular pipette tip. For example, a pipette tip designated as suitable to manipulate volumes up to 300 microliters, can sometimes be used to manipulate volumes up to about 1%, 2%, 3%, 5%, 10%, 15% or sometimes as much as up to about 20% larger than the designated pipette tip volume.

Methods of Manufacture

Pipette tips may be manufactured by injection molding. In some embodiments, pipette tips described herein are injection molded as a unitary construct. Injection molding is a manufacturing process for producing objects (e.g., pipette tips, for example) from thermoplastic (e.g., nylon, polypropylene, polyethylene, polystyrene and the like, for example) and thermosetting plastic (e.g., epoxy and phenolics, for example) materials. In some embodiments, a polymer is chosen from low density polyethylene (LDPE), high-density polyethylene (HDPE), polypropylene (PP), high impact polystyrene (HIPS), polyvinyl chloride (PVC), amorphous polyethylene terephthalate (APET), polycarbonate (PC) and polyethylene (PE). Pipette tips can include, or can be manufactured from, a recyclable material and/or degradable material (e.g., a bio-degradable material), non-limiting examples of which are disclosed in International Application no. PCT/US2009/063762 filed on Nov. 9, 2009 and published as WO 2010/054337 on May 14, 2010. Pipette tips, in some embodiments, include an anti-microbial agent, non-limiting examples of which are disclosed in International Application no. PCT/US2009/047541 filed on Jun. 16, 2009.

The plastic material of choice often is fed into a heated barrel, mixed, and forced into a mold cavity where it cools and hardens to the configuration of the mold cavity. The melted material sometimes is forced or injected into the mold cavity, through openings (e.g., a sprue), under pressure. A pressure injection method ensures the complete filling of the mold with the melted plastic. After the mold cools, the mold portions are separated, and the molded object is ejected. In some embodiments, additional additives can be included in the plastic or heated barrel to give the final product additional properties (e.g., anti-microbial properties, anti-static properties, anti-foaming function and combinations thereof, for example).

A mold is configured to hold the molten plastic in the correct geometry to yield the desired product upon cooling of the plastic. Injection molds sometimes are made of two or more parts, and comprise a core pin. The core pin sometimes can determine the thickness of the object wall, as the distance between the core pin and the outer mold portion is the wall thickness. Molds are typically designed so that the molded part reliably remains on the core pin when the mold opens, after cooling. The core pin sometimes can be referred to as the ejector side of the mold. The molded part can then fall freely away from the mold when ejected from the core pin, or ejector side of the mold. In some embodiments, ejector pins and/or an ejector sleeve push the pipette tip from the core pin.

Also provided herein is a mold for manufacturing a pipette tip by an injection mold process, which comprises a body that forms an exterior portion of the pipette tip and a member that forms an inner surface of the pipette tip, where the member comprises an irregular surface that results in a portion of the inner surface that is irregular (e.g., annular groove). In some embodiments, the member is a core pin for forming the inner surface of a pipette tip.

Provided also herein is a method for manufacturing a pipette tip comprising (a) contacting a pipette tip mold with a molten polymer, and releasing the formed pipette tip from the mold after cooling, where the pipette tip comprises a proximal region and a distal region, and further where the proximal region comprises an exterior surface and an annular flange at the proximal terminus of the proximal region and the proximal region comprises axially oriented grooves and panels circumferentially spaced around the exterior surface of the proximal region. In some embodiments, a pipette tip has a distal region that has a continuous taper of a pipette tip wall surface to form an edge or boundary of minimal thickness.

Provided also herein is a method for manufacturing a pipette tip comprising (a) contacting a pipette tip mold with a molten polymer, and releasing the formed pipette tip from the mold after cooling, where the pipette tip comprises a proximal region and a distal region, and further where the proximal region comprises an interior surface comprising axially oriented grooves and panels circumferentially spaced around the interior surface of the proximal region. In some embodiments, a pipette tip has a distal region that has a continuous taper of a pipette tip wall surface to form an edge or boundary of minimal thickness.

EXAMPLES OF EMBODIMENTS

Provided hereafter are non-limiting examples of certain embodiments of the technology.

A1. A pipette tip comprising an exterior surface, an interior surface, a proximal region, a distal region and a junction between the proximal region and the distal region, which proximal region comprises:

- an annular flange at the proximal terminus of the proximal region,
- a distal terminal shoulder at the junction,
- a plurality of longitudinally-oriented grooves on the exterior surface of the pipette tip extending from the flange to the shoulder, wherein: each groove comprises a groove width and a groove floor,
- a plurality of longitudinally-oriented panels on the exterior surface of the pipette tip, wherein:
  - each panel is adjacent to a groove,
  - each panel or a portion thereof extends over a sealing zone,
  - each panel comprises a panel sidewall, a panel face and a panel width, and
  - each panel width is greater than each groove width;
- a distance between a groove floor and an interior surface of a pipette tip opposite the groove floor, for each groove, is less than a distance between a panel face and an interior surface of a pipette tip opposite the panel face, for each panel; and which interior surface of a pipette tip defines a substantially frustum-shaped void and is substantially smooth and uniform.

A2. The pipette tip of embodiment A1, wherein the distance between a groove floor and an interior surface of a pipette tip opposite the groove floor is about 0.012 inches or less.

A3. The pipette tip of embodiment A2, wherein the distance between a groove floor and an interior surface of a pipette tip opposite the groove floor is about 0.08 inches or less.

A3.1. The pipette tip of embodiment A3, wherein the distance between a groove floor and an interior surface of a pipette tip opposite the groove floor is about 0.05 inches or less.

A3.2. The pipette tip of embodiment A3.1, wherein the distance between a groove floor and an interior surface of a pipette tip opposite the groove floor is about 0.03 inches or A4. The pipette tip of any one of embodiments A1-A3.2, wherein the distance between a groove floor and an interior surface of a pipette tip opposite the groove floor is substantially the same for two or more of the grooves on the pipette tip.

A4.1 The pipette tip of embodiment A4, wherein the distance between a groove floor and an interior surface of a pipette tip opposite the groove floor is substantially the same for all of the grooves.

A5. The pipette tip of embodiment A4.1, wherein for one or more of the grooves the distance between a groove floor and an interior surface of a pipette tip opposite the groove floor is substantially the same from the flange to the shoulder.

A6. The pipette tip of any one of embodiments A1-A5, wherein two or more of the grooves are circumferentially distributed symmetrically around the proximal region.

A6.1. The pipette tip of embodiment A6, wherein the grooves are circumferentially distributed symmetrically around the proximal region.

A6.2. The pipette tip of any one of embodiments A1-A5, wherein two or more of the grooves are circumferentially distributed asymmetrically around the proximal region.

A6.3. The pipette tip of embodiment A6.2, wherein the grooves are circumferentially distributed asymmetrically around the proximal region.

25 A7. The pipette tip of any one of embodiments A1-A6.3, wherein there are three or more grooves.

A8. The pipette tip of any one of embodiments A1-A6.3, wherein there are four or more grooves.

A9. The pipette tip of any one of embodiments A1-A8, wherein the groove width for one or more of the grooves is a linear width of about 0.003 inches to about 0.040 inches.

A10. The pipette tip of any one of embodiments A1-A8 wherein the groove width for one or more of the grooves is a circumferential width of about 5 degrees to about 30 degrees.

A11. The pipette tip of any one of embodiments A1-A10, wherein the groove width for two or more of the grooves is substantially the same.

A11.1. The pipette tip of embodiment A11, wherein the groove width for all of the grooves is substantially the same.

A11.2. The pipette tip of any one of embodiments A1-A10, wherein the groove width is not the same for two or more grooves.

A11.3. The pipette tip of embodiment A11.2, wherein the groove width is not the same for all of the grooves.

A12. The pipette tip of any one of embodiments A1-A11, wherein the groove width for one or more of the grooves is substantially equal from the flange to the shoulder.

A13. The pipette tip of any one of embodiments A1-A12, wherein grooves have a latitudinal profile and two or more of the grooves have stepped, v-shaped or u-shaped latitudinal profiles.

A13.1. The pipette tip of embodiment A13, wherein each groove has a groove floor with a linear, pointed or substantially pointed or curved latitudinal profile.

A14. The pipette tip of any one of embodiments A1-A13.1, wherein two or more of the panels are circumferentially distributed symmetrically around the proximal region.

A14.1. The pipette tip of embodiment A14, wherein the panels are circumferentially distributed symmetrically around the proximal region.

A14.2. The pipette tip of any one of embodiments A1-A14, wherein two or more of the panels are circumferentially distributed asymmetrically around the proximal region.

A14.3. The pipette tip of embodiment A14.2, wherein the panels are circumferentially distributed asymmetrically around the proximal region.

A14.4. The pipette tip of any one of embodiments A1-A14.3, wherein there are three or more panels.

A14.5. The pipette tip of any one of embodiments A1-A14.3, wherein there are four or more panels.

A14.6. The pipette tip of any one of embodiments A1-A14.5, wherein one or more of the panels on the exterior surface of the pipette tip extends from the flange to the shoulder.

A15. The pipette tip of any one of embodiments A1-A14.5, wherein the panel width for one or more of the panels is a linear width of about 0.025 inches to about 0.175 inches.

A16. The pipette tip of any one of embodiments A1-A14.5, wherein the panel width for one or more of the panels is a circumferential width of about 10 degrees to about 175 degrees.

A17. The pipette tip of any one of embodiments A1-A16, wherein the panel width for two or more of the panels is substantially the same.

A17.1. The pipette tip of embodiment A17, wherein the panel width for all of the panels is substantially the same.

A17.2. The pipette tip of any one of embodiments A1-A16, wherein the panel width is not the same for two or more panels.

A17.3. The pipette tip of embodiment A17.2, wherein the panel width is not the same for all of the panels.

A18. The pipette tip of any one of embodiments A1-A17.3, wherein the panel width for one or more of the panels is substantially equal from the flange to the shoulder.

A18.1. The pipette tip of any one of embodiments A1-A18, wherein panels have a latitudinal profile and two or more of the panels have a stepped or curved latitudinal profile.

A18.2. The pipette tip of embodiment A18.1, wherein each panel has a panel face with a linear or curved latitudinal profile.

A18.3 The pipette tip of embodiment A18.1, wherein each panel has a panel sidewall with a stepped, beveled or curved latitudinal profile.

A19. The pipette tip of any one of embodiments A1-A18.3, wherein each panel width is at least two times greater than each groove width.

A20. The pipette tip of embodiment A19, wherein each panel width is at least five times greater than each groove width.

A21. The pipette tip of embodiment A20, wherein each panel width is at least ten times greater than each groove width.

A22. The pipette tip of any one of embodiments A1-A21, wherein the distance between a panel face and an interior surface of a pipette tip opposite the panel face is about 0.010 inches to about 0.040 inches.

A23. The pipette tip of any one of embodiment A1 to A22, wherein the distance between a panel face and an interior surface of a pipette tip opposite the panel face for two or more of the panels is substantially the same.

A23.1. The pipette tip of embodiment A23, wherein the distance between a panel face and an interior surface of a pipette tip opposite the panel face for all of the panels is substantially the same.

A24. The pipette tip of any one of embodiments A1 to A23.1, wherein the distance between a panel face and an interior surface of a pipette tip opposite the panel face for one or more of the panels is substantially the same from the flange to the shoulder.

A25. The pipette tip of any one of embodiments A1-A24, wherein one or more of the panels comprises a protrusion.

A26. The pipette tip of embodiment A25, wherein all of the panels comprise a protrusion.

A27. The pipette tip of embodiment A25 or A26, wherein each protrusion comprises a protrusion face and each panel comprises a transition surface between the panel face and the protrusion face.

A28. The pipette tip of embodiment A27, wherein the transition surface is stepped, beveled or curved.

A28.1. The pipette tip of embodiment A27, wherein the protrusion face is linear or curved.

A28.2. The pipette tip of any one of embodiments A25-A28.1, wherein the protrusion comprises a protrusion width and the protrusion width for one or more of the protrusions is a linear width of about 0.010 inches to about 0.10 inches.

A29. The pipette tip of any one of embodiments A25-A28.1, wherein the protrusion comprises a protrusion width and the protrusion width for one or more of the protrusions is a circumferential width of about 5 degrees to about 160 degrees.

A29.1 The pipette tip of any one of embodiments A25-A29, wherein the distance between a panel face and a protrusion face is about 0.005 inches to about 0.050 inches.

A30. The pipette tip of any one of embodiments A1-A29.1, wherein the flange comprises a substantially uniform thickness.

A31. The pipette tip of any one of embodiments A1-A30, wherein the flange comprises a distal perimeter and the grooves extend from the flange distal perimeter to the shoulder.

A32. The pipette tip of any one of embodiments A1-A31, wherein the flange comprises a distal perimeter and the panels extend from the flange distal perimeter to the shoulder.

A33. The pipette tip of any one of embodiments A1-A32, wherein the interior surface of the pipette tip comprises an annular groove.

A33.1. The pipette tip of embodiment A33, wherein the annular groove is distal to the sealing zone.

A33.2. The pipette tip of embodiment A33, wherein the annular groove is proximal to the sealing zone.

A34. The pipette tip of any one of embodiments A1-A33.2, wherein the distal region of a pipette tip has a continuous taper of a pipette tip wall surface to form an edge or boundary of minimal thickness.

A34.1. The pipette tip of embodiment A34, wherein the wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0030 inches to about 0.0055 inches.

A35. The pipette tip of embodiment A34.1, wherein the wall thickness at the distal region terminus is about 0.0043 inches to about 0.0050 inches.

A36. The pipette tip of embodiment A35, wherein the wall thickness at the distal region terminus is about 0.0044 inches to about 0.0049 inches.

A37. The pipette tip of any one of embodiments A34-A36, wherein the interior surface of the pipette tip of the distal region is substantially smooth.

A38. The pipette tip of any one of embodiments A34-A37, wherein the pipette tip retains less than 0.065% of the fluid drawn into the pipette tip after the liquid is dispensed.

A39. The pipette tip of any one of embodiments A34-A37, wherein the pipette tip retains no more than 0.00012% of the fluid drawn into the pipette tip after the liquid is dispensed.

A40. The pipette tip of tip of any one of embodiments A1-A39, wherein:

- the interior surface of the pipette tip in the proximal region is in contact with the exterior surface of a fluid dispensing device member and forms a seal between the fluid dispensing device member and the interior surface of the pipette tip in pipette tip at the sealing zone; and
- the proximal region of the pipette tip is in an expanded state relative to a relaxed state adopted by the proximal region of the pipette tip when the interior surface of the pipette tip is not in contact with the fluid dispensing device member and forming a seal with the fluid dispensing device member.

A41. The pipette tip of any one of embodiments A1-A40, wherein the proximal region is capable of hoop stretching at a sealing zone upon insertion of a fluid dispensing device member into the interior of the pipette tip, and wherein the hoop stretching is about 0.001 inches to about 0.005 inches.

A42. The pipette tip of embodiment A41, wherein the hoop stretching is about 0.002 inches to about 0.004 inches.

A43. The pipette tip of embodiment A42, wherein the hoop stretching is about 0.003 inches.

B1. A method for engaging a pipette tip with a fluid dispensing device member comprising inserting a fluid dispensing device member into a pipette tip of any one of embodiments A1-A43 at a force sufficient to form a seal between the fluid dispensing device member and the pipette tip at a sealing zone.

B2. The method of embodiment B1, wherein the proximal region of the pipette tip hoop stretches at the sealing zone, and wherein the amount of hoop stretching is about 0.001 inches to about 0.005 inches.

C1. A pipette tip comprising an exterior surface, an interior surface, a proximal region, a distal region and a junction between the proximal region and the distal region, which proximal region comprises:

- a distal terminal shoulder at the junction,
- a plurality of longitudinally-oriented grooves on the interior surface of the pipette tip extending from a proximal terminus to the shoulder, wherein: each groove comprises a groove width and a groove floor, a plurality of longitudinally-oriented panels on the interior surface of the pipette tip, wherein:

each panel is adjacent to a groove, each panel or a portion thereof extends over a sealing zone, each panel comprises a panel sidewall, a panel face and a panel width, and each panel width is greater than each groove width;

a distance between a groove floor and an exterior surface of a pipette tip opposite the groove floor, for each groove, is less than a distance between a panel face and an exterior surface of a pipette tip opposite the panel face, for each panel; and which exterior surface of a pipette tip is substantially cylindrical and is substantially smooth and uniform.

C2. The pipette tip of embodiment C1, wherein the distance between a groove floor and an exterior surface of a pipette tip opposite the groove floor is about 0.012 inches or less.

C3. The pipette tip of embodiment C2, wherein the distance between a groove floor and an exterior surface of a pipette tip opposite the groove floor is about 0.008 inches or C3.1. The pipette tip of embodiment C3, wherein the distance between a groove floor and an exterior surface of a pipette tip opposite the groove floor is about 0.005 inches or less.

C3.2. The pipette tip of embodiment C3.1, wherein the distance between a groove floor and an exterior surface of a pipette tip opposite the groove floor is about 0.003 inches or less.

C4. The pipette tip of any one of embodiments C1-C3.2, wherein the distance between a groove floor and an exterior surface of a pipette tip opposite the groove floor is substantially the same for two or more of the grooves on the pipette tip.

C4.1. The pipette tip of embodiment C4, wherein the distance between a groove floor and an exterior surface of a pipette tip opposite the groove floor is substantially the same for all of the grooves.

C5. The pipette tip of embodiment C4.1, wherein for one or more of the grooves the distance between a groove floor and an exterior surface of a pipette tip opposite the groove floor is substantially the same from the proximal region terminus to the shoulder.

C6. The pipette tip of any one of embodiments C1-C5, wherein two or more of the grooves are circumferentially distributed symmetrically around the proximal region.

C6.1. The pipette tip of embodiment C6, wherein the grooves are circumferentially distributed symmetrically around the proximal region.

C6.2. The pipette tip of any one of embodiments C1-C5, wherein two or more of the grooves are circumferentially distributed asymmetrically around the proximal region.

C6.3. The pipette tip of embodiment C6.2, wherein the grooves are circumferentially distributed asymmetrically around the proximal region.

C7. The pipette tip of any one of embodiments C1-C6.3, wherein there are three or more grooves.

C8. The pipette tip of any one of embodiments C1-C6.3, wherein there are four or more grooves.

C9. The pipette tip of any one of embodiments C1-C8, wherein the groove width for one or more of the grooves is a linear width of about 0.003 inches to about 0.040 inches.

C10. The pipette tip of any one of embodiments C1-C8 wherein the groove width for one or more of the grooves is a circumferential width of about 5 degrees to about 30 degrees.

C11. The pipette tip of any one of embodiments C1-C10, wherein the groove width for two or more of the grooves is substantially the same.

C11.1. The pipette tip of embodiment C11, wherein the groove width for all of the grooves is substantially the same.

C11.2. The pipette tip of any one of embodiments C1-C10, wherein the groove width is not the same for two or more grooves.

C11.3. The pipette tip of embodiment C11.2, wherein the groove width is not the same for all of the grooves.

C12. The pipette tip of any one of embodiments C1-C11.3, wherein the groove width for one or more of the grooves is substantially equal from the proximal region terminus to the shoulder.

C13. The pipette tip of any one of embodiments C1-C12, wherein grooves have a latitudinal profile and two or more of the grooves have stepped, v-shaped or u-shaped latitudinal profiles.

C13.1. The pipette tip of embodiment C13, wherein each groove has a groove floor with a linear, pointed or substantially pointed or curved latitudinal profile.

C14. The pipette tip of any one of embodiments C1-C13.1, wherein two or more of the panels are circumferentially distributed symmetrically around the proximal region.

C14.1. The pipette tip of embodiment C14, wherein the panels are circumferentially distributed symmetrically around the proximal region.

C14.2. The pipette tip of any one of embodiments C1-C14, wherein two or more of the panels are circumferentially distributed asymmetrically around the proximal region.

C14.3. The pipette tip of embodiment C14.2, wherein the panels are circumferentially distributed asymmetrically around the proximal region.

C14.4. The pipette tip of any one of embodiments C1-C14.3, wherein there are three or more panels.

C14.5. The pipette tip of any one of embodiments C1-C14.3, wherein there are four or more panels.

C14.6. The pipette tip of any one of embodiments C1-C14.5, wherein one or more of the panels on the interior surface of the pipette tip extends from the proximal region terminus to the shoulder.

C15. The pipette tip of any one of embodiments C1-C14.5, wherein the panel width for one or more of the panels is a linear width of about 0.025 inches to about 0.175 inches.

C16. The pipette tip of any one of embodiments C1-C14.5, wherein the panel width for one or more of the panels is a circumferential width of about 10 degrees to about 175 degrees.

C17. The pipette tip of any one of embodiments C1-C16, wherein the panel width for two or more of the panels is substantially the same.

C17.1. The pipette tip of embodiment C17, wherein the panel width for all of the panels is substantially the same.

C17.2. The pipette tip of any one of embodiments C1-C16, wherein the panel width is not the same for two or more panels.

C17.3. The pipette tip of embodiment C17.2, wherein the panel width is not the same for all of the panels.

C18. The pipette tip of any one of embodiments C1-C17.3, wherein the panel width for one or more of the panels is substantially equal from the proximal region terminus to the shoulder.

C18.1. The pipette tip of any one of embodiments C1-C18, wherein the panels have a latitudinal profile and two or more of the panels have a stepped or curved latitudinal profile.

C18.2. The pipette tip of embodiment C18.1, wherein each panel has a panel face with a linear or curved latitudinal profile.

C18.3 The pipette tip of embodiment C18.1, wherein each panel has a panel sidewall with a stepped, beveled or curved latitudinal profile.

C19. The pipette tip of any one of embodiments C1-C18.3, wherein each panel width is at least two times greater than each groove width.

C20. The pipette tip of embodiment C19, wherein each panel width is at least five times greater than each groove width.

C21. The pipette tip of embodiment C20, wherein each panel width is at least ten times greater than each groove width.

C22. The pipette tip of any one of embodiments C1-C21, wherein the distance between a panel face and an exterior surface of a pipette tip opposite the panel face is about 0.010 inches to about 0.040 inches.

C23. The pipette tip of any one of embodiment C1 to C22, wherein the distance between a panel face and an exterior surface of a pipette tip opposite the panel face for two or more of the panels is substantially the same.

C23.1. The pipette tip of embodiment C23, wherein the distance between a panel face and an exterior surface of a pipette tip opposite the panel face for all of the panels is substantially the same.

C24. The pipette tip of any one of embodiments C1 to C23.1, wherein the distance between a panel face and an exterior surface of a pipette tip opposite the panel face for one or more of the panels is substantially the same from the proximal region terminus to the shoulder.

C25. The pipette tip of any one of embodiments C1-C24, wherein one or more of the panels comprises a protrusion.

C26. The pipette tip of embodiment C25, wherein all of the panels comprise a protrusion.

C27. The pipette tip of embodiment C25 or C26, wherein each protrusion comprises a protrusion face and each panel comprises a transition surface between the panel face and the protrusion face.

C28. The pipette tip of embodiment C27, wherein the transition surface is stepped, beveled or curved.

C28.1. The pipette tip of embodiment C27, wherein the protrusion face is linear or curved.

C28.2. The pipette tip of any one of embodiments C25-C28.1, wherein the protrusion comprises a protrusion width and the protrusion width for one or more of the protrusions is a linear width of about 0.010 inches to about 0.10 inches.

C29. The pipette tip of any one of embodiments C25-C28.1, wherein the protrusion comprises a protrusion width and the protrusion width for one or more of the protrusions is a circumferential width of about 5 degrees to about 160 degrees.

C29.1. The pipette tip of any one of embodiments C25-C29, wherein the distance between the panel face and the protrusion face is about 0.005 inches to about 0.050 inches.

C30. The pipette tip of any one of embodiments C1-C29.1, wherein the pipette tip comprises an annular groove.

C31. The pipette tip of any one of embodiments C1-C30, wherein the distal region of a pipette tip has a continuous taper of a pipette tip wall surface to form an edge or boundary of minimal thickness.

C31.1. The pipette tip of embodiment C31, wherein the wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0030 inches to about 0.0055 inches.

C32. The pipette tip of embodiment C31.1, wherein the wall thickness at the distal region terminus is about 0.0043 inches to about 0.0050 inches.

C33. The pipette tip of embodiment C32, wherein the wall thickness at the distal region terminus is about 0.0044 inches to about 0.0049 inches.

C34. The pipette tip of any one of embodiments C31-C33, wherein the interior surface of the pipette tip of the distal region is substantially smooth.

C35. The pipette tip of any one of embodiments C31-C34, wherein the pipette tip retains less than 0.065% of the fluid drawn into the pipette tip after the liquid is dispensed.

C36. The pipette tip of any one of embodiments C31-C34, wherein the pipette tip retains no more than 0.00012% of the fluid drawn into the pipette tip after the liquid is dispensed.

C37. The pipette tip of tip of any one of embodiments C1-C36, wherein:

the exterior surface of the pipette tip in the proximal region is in contact with the interior surface of a fluid dispensing device member and forms a seal between the fluid dispensing member and the exterior surface of the pipette tip at the sealing zone; and the proximal region of the pipette tip is in a compressed state relative to a relaxed state adopted by the proximal region of the pipette tip when the exterior surface of the pipette tip is not in contact with a fluid dispensing device member and forming a seal with the fluid dispensing device member.

C38. The pipette tip of any one of embodiments C1-C37, wherein the proximal region is capable of compression at a sealing zone upon contact of a fluid dispensing device member with the exterior surface of the pipette tip, and wherein the compression is about 0.001 inches to about 0.005 inches.

C39. The pipette tip of embodiment C38, wherein the compression is about 0.002 inches to about 0.004 inches.

C40. The pipette tip of embodiment C39, wherein the compression is about 0.003 inches.

D1. A method for engaging a pipette tip with a fluid dispensing device member comprising contacting a fluid dispensing device member with the exterior surface of a pipette tip of any one of embodiments C1-C40 at a force sufficient to form a seal between the fluid dispensing device member and the pipette tip at a sealing zone.

D2. The method of embodiment D1, wherein the proximal region of the pipette tip compresses at the sealing zone, and wherein the amount of compression is about 0.001 inches to about 0.005 inches.

E1. A method for manufacturing a pipette tip, comprising:

contacting a mold comprising an interior cavity configured to mold a pipette tip of any one of embodiments A1-A43 and C1-C40, with a molten polymer;

hardening the polymer in the mold, thereby forming the pipette tip in the mold; and ejecting pipette tip from the mold.

E2. The method of embodiment E1, wherein the mold comprises a metal.

E3. The method of embodiment E2, wherein the mold is manufactured from a metal.

E4. The method of embodiment E2 or E3, wherein the metal is chosen from aluminum, zinc, steel and a steel alloy.

E5. The method of any one of embodiments E1 to E4, wherein the polymer is chosen from low density polyethylene (LDPE), high-density polyethylene (HDPE), polypropylene (PP), high impact polystyrene (HIPS), polyvinyl chloride (PVC), amorphous polyethylene terephthalate (APET), polycarbonate (PC) and polyethylene (PE).

F1. A mold configured to form a pipette tip of any one of embodiments A1-A43 and 01-C40 by a molding process.

F2. The mold of embodiment F1, wherein the mold comprises a metal.

F3. The mold of embodiment F2, wherein the mold is manufactured from a metal.

F4. The mold of embodiment F2 or F3, wherein the metal is chosen from aluminum, zinc, steel and a steel alloy.

F5. The mold of any one of embodiments F1-F4, wherein the molding process is an injection molding process.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A pipette tip comprising an exterior surface, an interior surface, a proximal region, a distal region and a junction between the proximal region and the distal region, the proximal region comprising:

a proximal terminus, a distal terminus shoulder at the junction, longitudinally-oriented grooves on the exterior surface of the pipette tip, and longitudinally-oriented panels on the exterior surface of the pipette tip, wherein:

each panel or a portion thereof extends over a sealing zone;

each panel comprises a panel sidewall, a panel face and a panel width;

each groove comprises a groove width and a groove floor;

each groove or a portion thereof extends over the sealing zone;

each panel width is greater than each groove width;

a distance between a groove floor and an interior surface of a pipette tip opposite the groove floor, for each groove, is less than a distance between a panel face and an interior surface of a pipette tip opposite the panel face, for each panel; and a sealing zone of the interior surface of the pipette tip at the proximal region defines a substantially frustum-shaped void, and is substantially smooth and uniform.

2. The pipette tip of claim 1, wherein the distance between the groove floor of one of the grooves and an interior surface of a pipette tip opposite the groove floor is about 0.012 inches or less.

3. The pipette tip of claim 1, wherein the proximal region comprises an annular flange at the proximal terminus of the proximal region.

4. The pipette tip of claim 3, wherein the longitudinally-oriented grooves on the exterior surface of the pipette tip extend from the flange to the shoulder.

5. The pipette tip of claim 3, wherein one or more of the panels on the exterior surface of the pipette tip extends from the flange to the shoulder.

6. The pipette tip of claim 1, wherein the distance between the groove floor of one of the grooves and an interior surface of a pipette tip opposite the groove floor is substantially the same for two or more of the grooves on the pipette tip.

7. The pipette tip of claim 1, wherein two or more of the grooves are circumferentially distributed around the proximal region.

8. The pipette tip of claim 1, wherein there are three or more grooves.

9. The pipette tip of claim 1, wherein the groove width for one or more of the grooves is a linear width of about 0.003 inches to about 0.040 inches.

10. The pipette tip of claim 1, wherein the groove width for two or more of the grooves is substantially the same.

11. The pipette tip of claim 1, wherein grooves have a latitudinal profile and two or more of the grooves have stepped, v-shaped or u-shaped latitudinal profiles.

12. The pipette tip of claim 11, wherein the groove floor of each of the grooves has a linear, pointed or substantially pointed or curved latitudinal profile.

13. The pipette tip of claim 1, wherein two or more of the panels are circumferentially distributed around the proximal region.

14. The pipette tip of claim 1, wherein the panel width for two or more of the panels is substantially the same.

15. The pipette tip of claim 1, wherein panels have a latitudinal profile and two or more of the panels have a stepped or curved latitudinal profile.

16. The pipette tip of claim 1, wherein each panel width is at least five times greater than each groove width.

17. The pipette tip of claim 1, wherein the distance between a panel face and an interior surface of a pipette tip opposite the panel face is about 0.010 inches to about 0.040 inches.

18. The pipette tip of claim 1, wherein the panel width for one or more of the panels is a linear width of about 0.025 inches to about 0.175 inches.

19. The pipette tip of claim 1, wherein the proximal region is capable of hoop stretching at a sealing zone upon insertion of a fluid dispensing device member into the interior of the pipette tip, and wherein the hoop stretching is about 0.001 inches to about 0.005 inches.

20. A method for engaging a pipette tip with a fluid dispensing device member comprising inserting a fluid dispensing device member into a pipette tip of any one of claims 1-19 at a force sufficient to form a seal between the fluid dispensing device member and the pipette tip at a sealing zone.

* * * * *